United States Patent
Lattner et al.

(10) Patent No.: US 7,102,050 B1
(45) Date of Patent: Sep. 5, 2006

(54) MULTIPLE RISER REACTOR

(75) Inventors: James R. Lattner, Seabrook, TX (US); Jeffrey S. Smith, Seabrook, TX (US); Nicolas P. Coute, Houston, TX (US); Keith H. Kuechler, Friendswood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/564,613

(22) Filed: May 4, 2000

(51) Int. Cl.
    *C07C 1/00* (2006.01)
(52) U.S. Cl. .................... 585/640; 585/638; 585/639; 585/921; 585/922; 585/923; 585/926
(58) Field of Classification Search ............... 585/640, 585/300, 301, 302, 922, 923, 921, 926, 638, 585/639; 208/80, 155, 156; 422/214
See application file for complete search history.

(56) References Cited

U.S. PATENT DOCUMENTS

| | | |
|---|---|---|
| 1,421,640 A | 7/1922 | Whitaker et al. |
| 2,378,236 A | 6/1945 | Miller .................. 260/682 |
| 2,472,377 A | 6/1949 | Keith .................. 260/449.6 |
| 2,768,127 A | 10/1956 | Kimberlin, Jr. et al. ...... 196/55 |
| 2,847,364 A | 8/1958 | Hirsch .................. 196/53 |
| 3,205,275 A | 9/1965 | Johnson .................. 260/667 |
| 3,258,455 A | 6/1966 | Natta et al. .................. 260/93.7 |
| 3,305,538 A | 2/1967 | Natta et al. .................. 260/93.7 |
| 3,364,190 A | 1/1968 | Emrick .................. 260/93.7 |
| 3,645,992 A | 2/1972 | Elston .................. 260/80.78 |
| 3,764,634 A | 10/1973 | Ozawa et al. .................. 260/683 |
| 3,959,117 A | 5/1976 | Bunn, Jr. et al. ............ 208/113 |
| 3,969,426 A * | 7/1976 | Owen et al. .................. 585/301 |
| 4,076,698 A | 2/1978 | Anderson et al. ........ 526/348.6 |
| 4,076,796 A | 2/1978 | Reh et al. .................. 423/659 |
| 4,134,926 A | 1/1979 | Tsao et al. .................. 260/682 |
| 4,138,440 A | 2/1979 | Chang et al. ............... 260/668 |
| 4,229,608 A | 10/1980 | Chen et al. .................. 585/640 |
| 4,243,691 A | 1/1981 | Mohlenkamp, Jr et al. . 426/649 |
| 4,302,565 A | 11/1981 | Goeke et al. .................. 526/88 |
| 4,379,123 A | 4/1983 | Daviduk et al. ............ 422/142 |
| 4,404,414 A * | 9/1983 | Penick et al. ............... 585/469 |
| 4,440,871 A | 4/1984 | Lok et al. .................. 502/214 |

(Continued)

FOREIGN PATENT DOCUMENTS

EP     096 996     12/1983

(Continued)

OTHER PUBLICATIONS

Blackwell et al., "Solid-State NMR of Silicoaluminophosphate Molecular Sieves and Aluminophosphate Materials," J. Phys. Chem, 92, 3965-3970 (1988).

(Continued)

*Primary Examiner*—Glenn Caidarola
*Assistant Examiner*—In Suk Bullock

(57) ABSTRACT

The present invention is directed to a hydrocarbon conversion apparatus. The apparatus comprises the following: a plurality of riser reactors, each of the riser reactors having a first end into which a catalyst can be fed and a second end through which the catalyst can exit the riser reactor; a separation zone into which the second ends of the riser reactors extend, the separation zone being provided to separate the catalyst from products of a reaction conducted in the hydrocarbon conversion apparatus; and at least one catalyst return in fluid communication with the separation zone and the first ends of the riser reactors, the catalyst return being provided to transfer the catalyst from the separation zone to the first ends of the riser reactors.

20 Claims, 5 Drawing Sheets

U.S. PATENT DOCUMENTS

| | | | |
|---|---|---|---|
| 4,499,327 A | 2/1985 | Kaiser | 585/640 |
| 4,547,616 A | 10/1985 | Avidan et al. | 585/640 |
| 4,590,320 A | 5/1986 | Sapre | 585/324 |
| 4,659,685 A | 4/1987 | Coleman, III et al. | 502/113 |
| 4,677,242 A | 6/1987 | Kaiser | 585/638 |
| 4,677,243 A | 6/1987 | Kaiser | 585/640 |
| 4,683,121 A | 7/1987 | Goudriaan et al. | 422/197 |
| 4,688,808 A | 8/1987 | Iijima | 277/223 |
| 4,752,651 A | 6/1988 | Kaiser | 585/640 |
| 4,814,541 A | 3/1989 | Lewis | 585/640 |
| 4,861,938 A | 8/1989 | Lewis et al. | 585/640 |
| 4,873,390 A | 10/1989 | Lewis et al. | 585/638 |
| 4,929,798 A | 5/1990 | De Lasa | 585/922 |
| 4,973,792 A | 11/1990 | Lewis et al. | 585/638 |
| 5,095,163 A | 3/1992 | Barger | 585/640 |
| 5,157,181 A | 10/1992 | Stine et al. | 585/329 |
| 5,157,193 A | 10/1992 | Miller | 585/640 |
| 5,191,141 A | 3/1993 | Barger et al. | 585/640 |
| 5,271,905 A | 12/1993 | Owen et al. | 422/142 |
| 5,278,345 A | 1/1994 | Janssen et al. | 585/640 |
| 5,343,830 A | 9/1994 | Alexander et al. | 122/4 |
| 5,475,182 A | 12/1995 | Janssen | 585/640 |
| 5,714,662 A | 2/1998 | Vora et al. | 585/640 |
| 5,714,663 A | 2/1998 | Serrand et al. | 585/648 |
| 5,723,094 A | 3/1998 | Sunavala | 422/197 |
| 5,811,621 A | 9/1998 | van Dijk | 585/639 |
| 5,892,079 A | 4/1999 | Wilson, Jr. | 556/11 |
| 5,904,880 A | 5/1999 | Sun | 252/373 |
| 5,907,076 A | 5/1999 | Ou et al. | 585/800 |
| 5,925,586 A | 7/1999 | Sun | 502/62 |
| 5,925,800 A | 7/1999 | Sun et al. | 585/640 |
| 5,927,063 A | 7/1999 | Janda et al. | 60/39.02 |
| 5,932,512 A | 8/1999 | Sun | 502/214 |
| 5,952,538 A | 9/1999 | Vaughn et al. | 585/640 |
| 5,958,222 A | 9/1999 | Radcliffe et al. | 208/163 |
| 5,960,643 A | 10/1999 | Kuechler et al. | 62/620 |
| 5,962,762 A | 10/1999 | Sun et al. | 585/640 |
| 5,972,203 A | 10/1999 | Smith et al. | 208/113 |
| 6,004,898 A | 12/1999 | Sun | 502/214 |
| 6,005,155 A | 12/1999 | Sun | 585/640 |
| 6,023,005 A | 2/2000 | Lattner et al. | 585/639 |
| 6,040,264 A | 3/2000 | Sun et al. | 502/214 |
| 6,045,688 A | 4/2000 | Ruottu et al. | 208/113 |
| 6,046,371 A | 4/2000 | Wu et al. | 585/638 |
| 6,046,373 A | 4/2000 | Sun | 585/640 |
| 6,051,745 A | 4/2000 | Wu et al. | 585/638 |
| 6,051,746 A | 4/2000 | Sun et al. | 585/639 |
| 6,057,261 A | 5/2000 | Sun | 502/341 |
| 6,166,282 A | 12/2000 | Miller | 585/638 |

FOREIGN PATENT DOCUMENTS

| | | |
|---|---|---|
| EP | 0541915 A1 | 5/1993 |
| EP | 0844021 A2 | 5/1998 |
| EP | 1053783 A1 | 11/2000 |

OTHER PUBLICATIONS

Barger et al., "Converting Natural Gas to Ethylene and Propylene by the UOP/Hydro MTO Process," 12th International Zeolite Conference 1999 Materials Research Society p. 567-573.

Chang, "Methanol Conversion to Light Olefins," Catal. Rev.-Sci. Eng., 26(3&4), 323-345 (1984).

Kaeding et al., "Production of Chemicals from Methanol," Journal of Catalysis 61, 155-164 (1980).

Bos et al., "Conversion of Methanol to Lower Olefins. Kinetic Modeling Reactor Simulation, and Selection," Ind. Eng. Chem. Res. 1995, 34, 3808-3816.

"MTO—has its time come?" Nitrogen & Methanol, No. 246, Jul.-Aug. 2000.

* cited by examiner

MULTIPLE RISER REACTOR

FIELD OF THE INVENTION

The present invention relates to a reactor useful in hydrocarbon conversion processes and particularly in oxygenate to olefin conversion reactions.

BACKGROUND OF THE INVENTION

When converting a feedstock containing a hydrocarbon to a product in an industrial reactor, it is desirable to maximize the production of a desired product or products, and to control, typically to minimize, the production of by-products. One type of reactor useful for conducting hydrocarbon conversion reactions is a fluidized bed reactor, wherein solid catalyst particles are suspended in a fluidized state during contact with the feedstock and other vapor materials. These types of reactors usually have a cylindrical reactor geometry. One method for reducing the production of by-products in a fluidized bed reactor involves operating in a hydrodynamic flow regime such that the superficial gas velocity obtains a velocity high enough to cause the net flow of catalyst in the reactor to flow in the same direction as the flow of the feedstock and other vapors, i.e., the feedstock and other vapors essentially carry the catalyst particles along with them. These flow regimes are known to those skilled in the art as the fast-fluidized bed and riser regimes, more generally as the transport regime, and are preferred in reaction systems in which a more plug flow reactor type is desired.

In general, for a given reactor cross sectional area (which in a cylindrical reactor geometry is proportional to the diameter, and more generally to a characteristic width), the catalyst concentration in a fluidized bed reactor decreases with increasing gas superficial velocity. Higher gas superficial velocities generally require taller reactor heights to allow a given amount of feedstock to contact a required amount of catalyst. These higher gas superficial velocities necessitate a higher aspect ratio (the ratio of a reactor height to its diameter or characteristic width) of the reactor. Further, in many cases it is desired to make a fluidized reactor with a very large cross-sectional area to enable very large throughputs of feedstock in a single reactor facility. However, increasing fluid bed diameter, particularly in the transport regime, also necessitates increased reactor height. This increased height is required because a certain minimum reactor height, in terms of a minimum aspect ratio, is required to achieve a fully developed flow pattern which approximates plug flow reactor behavior. At the exit and, particularly, at the entrance of a transport regime fluidized bed reactor, unsteady state momentum effects dominate hydrodynamic behavior (e.g., the energy required for the feedstock vapors to pick up and accelerate the solid catalyst against the force of gravity) in a manner not conducive to obtaining approximate plug flow behavior. Not until these momentum effects are dampened out by progressing along the reactor height will a well behaved, approximately plug flow fluid/solid flow pattern emerge. Finally, should the use of lower activity catalysts be desired in the transport regime, aspect ratios must also increase to provide desired higher feedstock conversion.

Unfortunately, high aspect ratio transport fluid bed reactors are difficult and expensive to construct and maintain. They are expensive because they must have at the top a very large, heavy separation vessel, often filled with heavy equipment, to capture and manage the flowing catalyst and reactor product. As the reactor increases in height (aspect ratio), more expensive support structures may be required. In certain areas of the world where inclement, especially windy weather occurs routinely, even more structural support is required, and certain aspect ratios are not economic. Multiple, complete and independent reactor systems with independent separation vessels are required. With these multiple, complete and independent reactor systems come attendant multiplication of costs.

Thus, a need exists in the art for a reactor which can provide the desired aspect ratio without necessitating an unwieldy height, forcing a width in which the desired, fully developed flow regime may never be obtained, or without resulting to multiple, independent reactor systems.

SUMMARY OF THE INVENTION

The present invention provides a solution to the currently existing need in the art by providing a hydrocarbon conversion apparatus which comprises a plurality of riser reactors. By providing a plurality of riser reactors, the width or diameter of the feedstock conversion reactor can be reduced, and thus a desired aspect ratio can be maintained with its attendant closer approach to a desired, fully developed flow regime, at a reduced and more manageable reactor-height. Further, the invention provides the proper aspect ratio for a given riser reactor without the need for multiple, independent reactor systems.

One aspect of the present invention is directed to a hydrocarbon conversion apparatus. The hydrocarbon conversion apparatus comprises the following: a plurality of riser reactors, each of the riser reactors having a first end into which a catalyst can be fed and a second end through which the catalyst can exit the riser reactor; a catalyst retention zone provided to contain catalyst which can be fed to the riser reactors; a separation zone into which the second ends of the riser reactors extend, the separation zone being provided to separate the catalyst from products of a reaction conducted in the hydrocarbon conversion apparatus; a catalyst return in fluid communication with the separation zone and the catalyst retention zone; and a feed distributor including at least one feed head positioned adjacent to each of the first ends of the riser reactors.

Another aspect of the present invention is directed to a hydrocarbon conversion apparatus. The apparatus comprises the following: a plurality of riser reactors, each of the riser reactors having a first end into which a catalyst can be fed and a second end through which the catalyst can exit the riser reactor; a separation zone into which the second ends of the riser reactors extend, the separation zone being provided to separate the catalyst from products of a reaction conducted in the hydrocarbon conversion apparatus; and at least one catalyst return in fluid communication with the separation zone and the first ends of the riser reactors, the catalyst return being provided to transfer the catalyst from the separation zone to the first ends of the riser reactors.

Yet another aspect of the present invention is directed to a hydrocarbon conversion process. The process comprises the following steps: (a) contacting a fluidizable catalyst with a fluidizing fluid to fluidize the fluidizable catalyst; (b) feeding the catalyst and a feed to a plurality of riser reactors, the plurality of riser reactors being part of a single hydrocarbon conversion apparatus; (c) reacting the feed with the catalyst in the plurality of riser reactors, the reaction of the feed and the catalyst producing a product; (d) separating the catalyst from the product in a separation zone, the separation zone being in fluid communication with the plurality of riser reactors; (e) returning the catalyst from the separation zone to the plurality of riser reactors; and (f) repeating steps (a) to (e).

These and other advantages of the present invention shall become apparent from the following detailed description of the invention, and the appended drawings and claims.

DETAILED DESCRIPTION OF THE INVENTION

Figure 1:
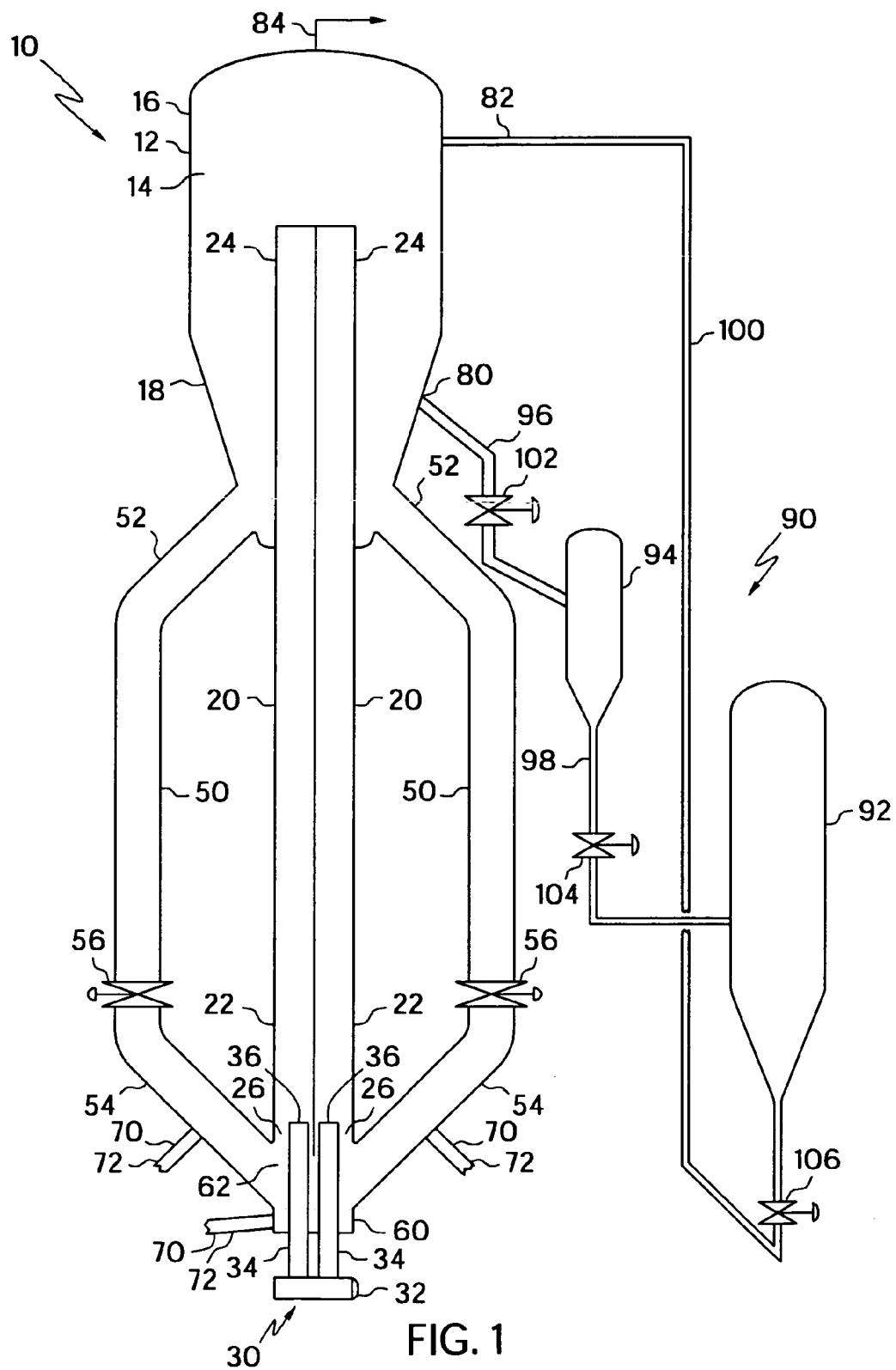
FIG. 1 presents a partial cross sectional view of a hydrocarbon conversion apparatus of the present invention.

FIG. 1 presents a partial cross sectional view of a hydrocarbon conversion apparatus 10 of the present invention. The apparatus 10 comprises a shell 12, a plurality of riser reactors 20, a feed distributor 30, and a catalyst return 50.

With continuing reference to FIG. 1, the shell 12 forms a separation zone 14 in which a product of the hydrocarbon conversion reaction is separated from the catalyst which catalyzes-the-hydrocarbon conversion reaction. Shell 12 includes a first end 16 and a second end 18. The separation zone 14 may additionally contain one or more separation devices, not shown, which are used to separate the products from the catalyst. Useful separation devices are discussed below in association with the discussion of other embodiments of the present invention. Further, the separation devices may be positioned externally to the separation zone 14, i.e., outside of the shell 12 of the hydrocarbon conversion apparatus 10, or a combination of externally and internally positioned separation devices.

Riser reactors 20 extend into shell 12 and into the separation zone 14. By extending the riser reactors 20 into shell 12 and the separation zone 14, the height required to obtain the desired aspect ratio of a given riser reactor 20 is concurrent with at least a portion of the height required for the shell 12, separation zone 14, and other associated spaces, reducing the total height of the hydrocarbon conversion reactor 10 of the present invention. Each riser reactor 20 includes a first end 22 into which the catalyst and feed are fed to conduct the hydrocarbon conversion reaction. Each riser reactor 20 further includes a second end 24 through which the catalyst, products and unreacted feed, if any, exit the riser reactor 20. The first end 22 of each riser reactor 20 terminates in a mouth 26 through which the catalyst and feed are fed into the riser reactor 20. The number of riser reactors 20 employed in the hydrocarbon conversion apparatus 10 varies depending on the hydrocarbon conversion process to be conducted in the apparatus 10. The apparatus 10 can contain two, three, four, five, six and even more than six riser reactors 20.

The size of the riser reactors 20 depends on parameters such as the superficial gas velocity, solids hydrodynamics, pressure, and production capacity of the desired hydrocarbon conversion process. In the present invention, each riser reactor 20 desirably has a height from 10 meters to 70 meters and a width (or diameter) of one meter to three meters. All of the riser reactors 20 have a similar height from their first ends 22 to their second-ends 24. Desirably, the heights of the riser reactors 20 vary by no more than 20% from one riser reactor 20 to another riser reactor 20. More desirably, the heights vary by no more than 10% and, most desirably, the heights vary by no more than 1%.

In the present invention, each of the riser reactors 20 has a similar cross sectional area along its entire height. Desirably, each of the riser reactors 20 has a cross sectional area of no greater than 12 $m^2$. More desirably, each of the riser reactors 20 has a cross sectional area of no greater than 7 $m^2$. Most desirably, each of the riser reactors 20 has a cross sectional area of no greater than 3.5 $m^2$. Desirably, the cross sectional areas of the riser reactors 20 vary by no more than 20% from one riser reactor 20 to another riser reactor 20. More desirably, the cross sectional areas of the riser reactors 20 vary by no more than 10% and, most desirably, the cross sectional areas of the riser reactors 20 vary by no more than 1%. If one or more riser reactors 20 have both a largest and a smallest cross-sectional area at different points along the height of riser reactors 20, desirably the largest cross-sectional areas of the riser reactors 20 vary by no more than 20% from one riser reactor 20 to another riser reactor 20, and the smallest cross-sectional areas of the riser reactors 20 vary by no more than 20% from one riser reactor 20 to another riser reactor 20. More desirably, the largest cross sectional area of one riser reactor 20 varies by no more than 10% from the largest cross sectional area of another riser reactor 20 and the smallest cross sectional area varies by no more than 10% from the smallest cross sectional area of another riser reactor 20. Most desirably, the largest cross sectional area of one riser reactor 20 varies by no more than 1% from the largest cross sectional area of another riser reactor 20 and the smallest cross sectional area varies by no more than 1% from the smallest cross sectional area of another riser reactor 20.

Desirably, the cross sectional area of each riser reactor 20 varies by no more than 50% along its entire length. More desirably, the cross sectional area of each riser reactor 20 varies by no more than 30% along its entire height and, most desirably, the cross sectional area of each riser reactor 20 varies by no more than 10% along its entire height.

To provide a feed to the riser reactors 20, at least one feed distributor 30 is positioned near the first ends 22 of the riser reactors 20. More than one feed distributor 30 may employed adjacent the first ends 22 of the riser reactors 20 to provide feed in various states, e.g., one feed distributor 30 may provide feed in a vapor form while a second feed distributor 30 may provide feed in a liquid form. Feed distributor 30 includes a body 32 from which a plurality of necks 34 extend. Each riser reactor 20 has at least one associated neck 34. Each neck 34 terminates in a head 36. Each head 36 of each neck 34 is positioned adjacent to the first end 22 of each riser reactor 20. Desirably, each head 36 extends upwardly into each riser reactor 20. More desirably, each head 36 is positioned at or above the mouth 26 at the first end 22 of each riser reactor 20. Feed distributor 30 may include an optional flow control device, not shown, positioned on feed distributor 30 to control the amount of feed to each neck 34 or a flow control device may be positioned on each neck 34. The flow control device can also be employed to measure flow as well as control it. Further, a nozzle, not shown, may be positioned on each head 36 to further control the distribution of the feed to each riser reactor 20. Additionally, each head 36 may be fitted with screening device, not shown, to prevent back flow of catalyst into any of necks 34 of feed distributor 30 and, subsequently, into body 32 of feed distributor 30.

At least one catalyst return 50 provides fluid communication between the separation zone of 14 of shell 12 and the riser reactors 20. Particularly, each catalyst return 50 provides fluid communication between the separation zone 14 and the first ends 22 of each riser reactor 20. Each catalyst return 50 has a first end 52 and a second end 54. The first end 52 of the catalyst return 50 opens into the second end 18 of shell 12 and the second end 54 of catalyst return 50 opens adjacent the riser reactors 20. Each catalyst return 50 is provided to transport catalyst from the separation zone 14 of shell 12 to the first ends 22 of the riser reactors 20. The apparatus 10 may include one, two, three, four, five, six or more catalyst returns 50. Typically, although not necessarily, the number of catalyst returns 50 corresponds to the number of riser reactors 20. In the embodiment shown in FIG. 1, the catalyst returns 50 are external to the riser reactors 20. However, as shown in subsequently described embodiments, the catalyst return 50 may be contained within a common shell or be positioned internally in relation to the riser reactors 20 or some combination thereof. Flow of catalyst through the catalyst return(s) 50 may optionally be controlled through the use of a flow control device 56 positioned on each catalyst return 50. The flow control device 56 can be any type of flow control device currently in use in the art to control catalyst flow through catalyst transfer lines. If employed, the flow control device 56 is desirably a ball valve, a plug valve or a slide valve.

The apparatus 10 further includes a base 60. In the embodiment shown in FIG. 1, the base 60, the catalyst returns 50 and the first ends 22 of the riser reactors 20 define a catalyst retention zone 62. The catalyst retention zone 62 is provided to retain catalyst which is used to catalyze the hydrocarbon conversion reaction which is conducted in the apparatus 10. The catalyst return 50 provides fluid communication between the separation zone 14 and the catalyst retention zone 62. To do so, the second ends 54 of the catalyst returns 50 open to the catalyst retention zone 62. As one of skill in the art will appreciate, the boundary between the catalyst retention zone 62 and the catalyst return 50 is fluid and depends, at least in part, on the level of catalyst contained in the catalyst return 50 and the catalyst retention zone 62.

A fluid distributor 70 is also positioned in or near the base 60 of the apparatus 10. The fluid distributor 70 includes a conduit 72 into which a fluidizing fluid is fed into catalyst retention zone 62 to fluidize a fluidizable catalyst in the catalyst retention zone 62 and the catalyst returns 50. Additional fluid distributors 70, as shown in FIG. 1, may also be positioned on each catalyst return 50 to fluidize a fluidizable catalyst contained in each of the catalyst returns 50.

The hydrocarbon conversion apparatus 10 may also include an outlet 80 through which the catalyst can be removed from the apparatus 10. The outlet 80 is shown as being positioned on the second end 18 of the shell 12 but may be positioned at any position on the apparatus 10. The apparatus 10 may also include an inlet 82 through which the catalyst may be placed into the apparatus 10. Although the inlet 82 is shown as being positioned on the first end 16 of the shell 12, the inlet 82 may be positioned at any position on the apparatus 10. A line 84 may be provided to remove hydrocarbon conversion products from the apparatus 10.

As shown in FIG. 1, the hydrocarbon conversion apparatus 10 of the present invention may optionally include an associated catalyst regeneration apparatus 90. The catalyst regeneration apparatus 90 is in fluid communication with the hydrocarbon conversion apparatus 10. The catalyst regeneration apparatus 90 includes a catalyst regenerator 92, which is in fluid communication with the hydrocarbon conversion apparatus 10, and an optional catalyst stripper 94, which is in fluid communication with the catalyst regenerator 92 and which may be in fluid communication with the hydrocarbon conversion apparatus 10. A first line 96 provides fluid communication between the catalyst stripper 94 and the outlet 80 on shell 12. A second line 98 provides fluid communication between the catalyst stripper 94 and the catalyst regenerator 92. A third line 100 provides fluid communication between the catalyst regenerator 92 and the inlet 82 on shell 12. A flow control device 102 may optionally be positioned on first line 96 to control the flow of catalyst between the shell 12 and the catalyst stripper 94. A flow control device 104 may optionally be positioned on second line 98 to control the flow of catalyst between the catalyst stripper 94 and the catalyst regenerator 92. Finally, a flow control device 106 may be positioned on third line 100 to control the flow of catalyst between the catalyst regenerator 92 and the shell 12. The flow control devices 102, 104 and 106 can be any types of flow control devices currently in use in the art to control catalyst flow through catalyst transfer lines. Useful flow control devices include ball valves, plug valves and slide valves. Although the catalyst stripper 94 is shown on FIG. 1 as being separate from the catalyst regenerator 92, one skilled in the art will appreciate that the catalyst stripper 94 may be integrally formed with the catalyst regenerator 92. One skilled in the art will also appreciate that, although FIG. 1 shows third line 100 as returning the catalyst to the separation zone 14 through line 82, the catalyst may also be returned to the catalyst return 50, the catalyst retention zone 62 and combinations of the separation zone 14, the catalyst return 50 and the catalyst retention zone 62.

When in operation, the hydrocarbon conversion apparatus 10, as shown in FIG. 1, functions in the following manner. The apparatus 10 is filled with an appropriate amount of a catalyst suitable to carry out the desired hydrocarbon conversion reaction. The catalyst should be of a type which is fluidizable. At least a portion of the catalyst is contained in the catalyst retention zone 62. To fluidize the catalyst in the catalyst retention zone 62, a fluidizing fluid is fed into the fluid distributor(s) 70 through inlet 72. The fluidizing fluid is fed into the catalyst retention zone 62 and the catalyst return(s) 50 of the hydrocarbon conversion apparatus 10. Useful fluidizing fluids include, but are not limited to, inert gasses, nitrogen, steam, carbon dioxide, hydrocarbons, and air. The choice of fluidizing fluid depends upon the type of conversion reaction being conducted in the hydrocarbon conversion apparatus 10. Desirably, the fluidizing fluid is unreactive (i.e. inert) in the reaction being conducted in the hydrocarbon conversion apparatus 10. In other words, it is desirable that the fluidizing fluid does not play a part in the hydrocarbon conversion process being conducted in the hydrocarbon conversion apparatus 10 other than to fluidize the fluidizable catalyst.

Once the catalyst has reached an acceptable fluidized state, a feed is fed into the hydrocarbon conversion apparatus 10 through feed distributor 30. The feed enters the body 32 of feed distributor 30, passes through the necks 34 of feed distributor 30 and exits through the heads 36 of feed distributor 30. The feed is distributed to each of the riser reactors 20 through their first ends 22. Desirably, the feed is provided in substantially equal streams to each riser reactor 20. By "substantially equal" it is meant that the flow of feed provided to each riser reactor 20 through the feed distributor 30 varies by no more than 25% by volume rate, and varies no more than 25% by mass percent for each component in the feed, from one riser reactor 20 to another riser reactor 20. More desirably, the flow of feed provided to each riser reactor 20 through the feed distributor 30 varies by no more than 10% by volume rate, and varies no more than 10% by mass percent for each component in the feed, from one riser reactor 20 to another riser reactor 20. Most desirably, feed provided to each riser reactor 20 through the feed distributor 30 varies by no more than 1% by volume rate, and varies no more than 1% by mass percent for each component in the feed, from one riser reactor 20 to another riser reactor 20.

A pressure differential created by the velocity of the feed entering the first ends 22 of the riser reactors 20 and the pressure of the height of fluidizable catalyst in the catalyst return(s) 50 and the catalyst retention zone 62 causes catalyst to be aspirated into the first ends 22 of the riser reactors 20. The catalyst is transported through the riser reactors 20 under well known principles of eduction in which the kinetic energy of one fluid, in this case the feed, is used to move another fluid, in this case the fluidized catalyst. The catalyst and feed travel from the first ends 22 to the second ends 24 of the riser reactors 20. As the catalyst and feed travel through the riser reactors 20, the hydrocarbon conversion reaction occurs and a conversion product is produced.

By designing the hydrocarbon conversion apparatus 10 with these features, each individual riser reactor 20 operates in a substantially identical manner. With this invention, it is desirable to maintain both the reactant feed rates and the catalyst feed rates at the same rates to each of the riser reactors 20. In this way, the conversion of the feed and selectivity to the desired products will be substantially identical and can run at optimum operational conditions.

The conversion product(s), unreacted feed, if any, and the catalyst exit the riser reactors 20 through their second ends 24 and enter into the separation zone 14 of shell 12. In second end 16 of shell 12, the conversion product and unreacted feed, if any, are separated from the catalyst by a separator, not shown, such as cyclonic separators, filters, screens, impingement devices, plates, cones, other devices which would separate the catalyst from the product of the conversion reaction, and combinations thereof. Desirably, the conversion product and unreacted feed, if any, are separated by a series of cyclonic separators. Once the catalyst has been separated from the conversion product and the unreacted feed, if any, the conversion products and unreacted feed, if any, are removed from the shell 12 through the line 84 for further processing such as separation and purification. The catalyst, after being separated from the products and unreacted feed, moves from the shell 12 to the catalyst retention zone 62. The catalyst exits shell 12 through the first ends 52 of the catalyst returns 50 and moves through the catalyst returns 50 to the first ends 54 of the catalyst returns 50 from which the catalyst moves to the catalyst retention zone 62. If desired, the flow of catalyst through the catalyst returns 50 can be controlled by the flow control devices 56. If the flow control devices 56 are employed, a height of fluidizable catalyst is maintained above each flow control device 56 in the catalyst return 50 to allow proper function of the flow control device 56.

If necessary or desired, at least a portion of the catalyst can be circulated to the catalyst regeneration apparatus 90, as shown in FIG. 1. Catalyst to be regenerated is removed from the shell 12 though the outlet 80 and transported, if desired, to the catalyst stripper 94 through the first line 96. The flow of catalyst between the hydrocarbon conversion apparatus 10 and the catalyst stripper 94 can be controlled by the flow control device 102. In the catalyst stripper 94, the catalyst is stripped of most of readily removable organic materials (organics). Stripping procedures and conditions for individual hydrocarbon conversion processes are within the skill of a person of skill in the art. The stripped catalyst is transferred from the catalyst stripper 94 to the catalyst regenerator 92 through the second line 98. The flow of catalyst through the second line 98 may optionally be controlled by the optional flow control device 104. In the catalyst regenerator 92, carbonaceous deposits formed on the catalyst during a hydrocarbon conversion reaction are at least partially removed from the catalyst. The regenerated catalyst is then transferred to the shell 12 of the hydrocarbon conversion apparatus 10 through the third line 100. The flow of catalyst through the third line 100 may optionally be controlled by the flow control device 106. A transport gas is typically provided to the third line 100 to facilitate transfer of the catalyst from the catalyst regenerator 92 to the hydrocarbon conversion apparatus 10. The catalyst is returned to the shell 12 through the inlet 82.

Figure 2:
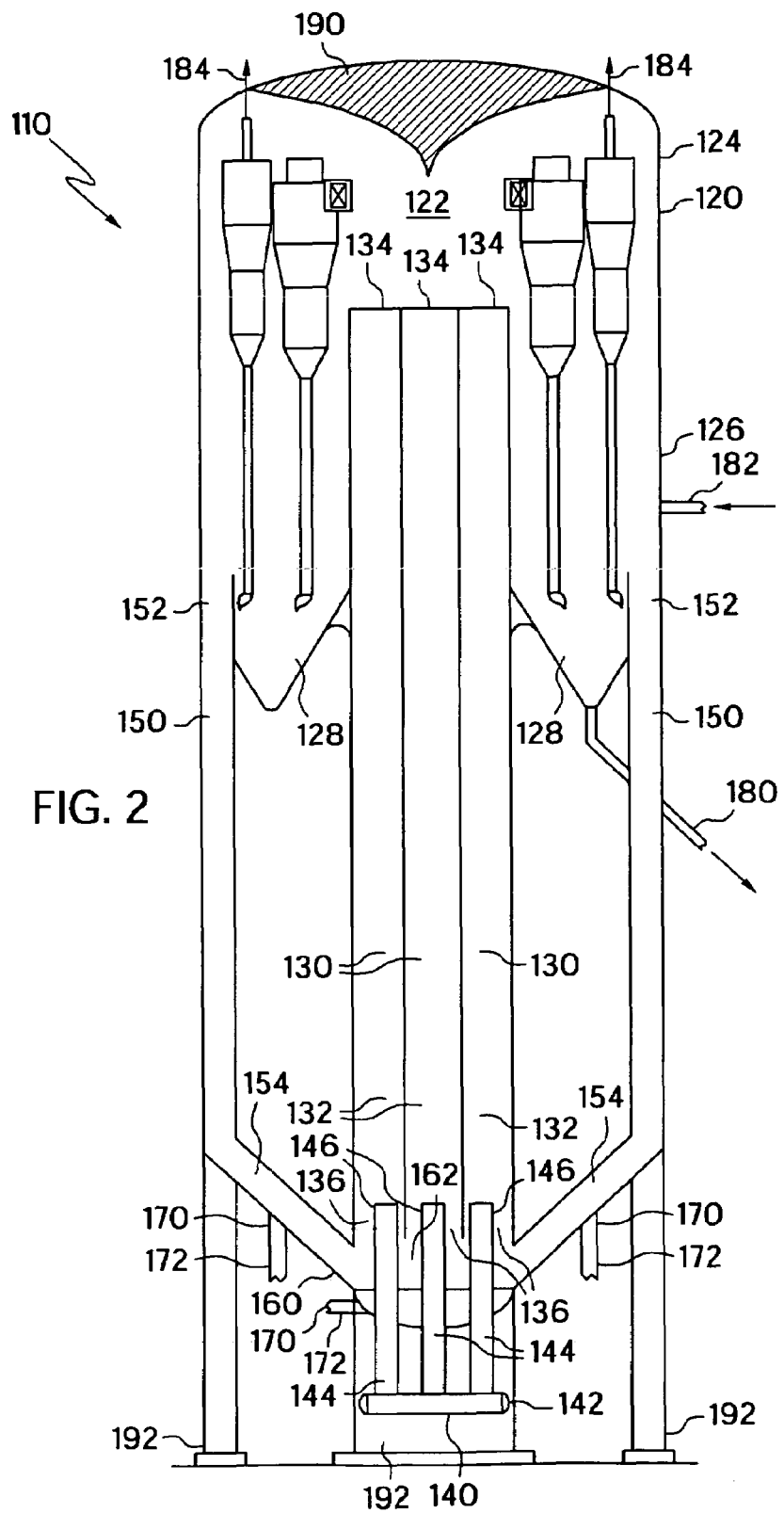
FIG. 2 presents a partial cross sectional view of another embodiment of the hydrocarbon conversion apparatus of the present invention.

Another embodiment of the hydrocarbon conversion apparatus 110 of the present invention is shown in partial cross section in FIG. 2. The apparatus 110 comprises a shell 120, a plurality of riser reactors 130, a feed distributor 140, and a catalyst return 150.

With continuing reference to FIG. 2, the shell 120 forms a separation zone 122 in which a product of the hydrocarbon conversion reaction is separated from the catalyst which catalyzes the hydrocarbon conversion reaction. Shell 120 includes a first end 124 and a second end 126. Shell 120 defines a quiescent zone 128 from which catalyst can be withdrawn from the hydrocarbon conversion apparatus 110.

Riser reactors 130 extend into shell 120 and the separation zone 122. Each riser reactor 130 includes a first end 132 into which the catalyst and feed are fed to conduct the hydrocarbon conversion reaction. Each riser reactor 130 further includes a second end 134 through which the catalyst, products and unreacted feed, if any, exit the riser reactor 130. The first end 132 of each riser reactor 130 terminates in a mouth 136 through which the catalyst and feed are fed into the riser reactor 130. As described above, the number of riser reactors 130 employed in the hydrocarbon conversion apparatus 110 varies depending on the hydrocarbon conversion process to be conducted in the apparatus 110. The number and size of the riser reactors 130 is discussed above in conjunction with the description of FIG. 1.

To provide a feed to the riser reactors 130, at least one feed distributor 140 is positioned near the first ends 132 of the riser reactors 130. More than one feed distributor 140 may employed to provide feed in various states, e.g., one feed distributor 140 may provide feed in a vapor form while a second feed distributor 140 may provide feed in a liquid form. Feed distributor 140 includes a body 142 from which a plurality of necks 144 extend. Each riser reactor 130 has at least one associated neck 144. Each head 146 of each neck 144 is positioned adjacent to the first end 132 of each riser reactor 130. Desirably, each head 146 extends upwardly into each riser reactor 130. More desirably, each head 146 is positioned at or above the mouth 136 at the first end 132 of each riser reactor 130. Feed distributor 140 may include an optional flow control device, not shown, positioned on feed distributor 140 to provide an equal amount of feed to each neck 144 or a flow control device may be positioned on each neck 144. The flow control device may also be employed to measure flow as well as control. Further, a nozzle, not shown, may be positioned on each head 146 to further control the distribution of the feed to each riser reactor 130. Additionally, each head 146 may be fitted with a screening device, not shown, to prevent back flow of catalyst into any of necks 144 of feed distributor 140 and, subsequently, into body 142 of feed distributor 140.

At least one catalyst return 150 provides fluid communication between the separation zone 122 of shell 120 and the riser reactors 130. Each catalyst return 150 has a first end 152 and a second end 154. The first end 152 of the catalyst return 150 opens adjacent the second end 126 of shell 120 and the second end 154 of catalyst return 150 opens to the riser reactors 130. Each catalyst return 150 is provided to transport catalyst from the separation zone 122 of shell 120 to the first ends 132 of the riser reactors 130. The apparatus 110 may include one, two, three, four, five, six or more catalyst returns 150. Typically, although not necessarily, the number of catalyst returns 150 corresponds to the number of riser reactors 130. Flow of catalyst through the catalyst return(s) 150 may optionally be controlled through the use of flow control devices, not shown, positioned on each catalyst return 150. The flow control devices can be any type of flow control devices currently in use in the art to control catalyst flow through catalyst transfer lines. If employed, the flow control device is desirably a ball valve, a plug valve or a slide valve.

The apparatus 110 further includes a base 160. In the embodiment shown in FIG. 2, the base 160, the catalyst returns 150 and the first ends 132 of the riser reactors 130 define a catalyst retention zone 162. The second ends 154 of the catalyst returns 150 open to the catalyst retention zone 162. The catalyst retention zone 162 is provided to retain catalyst which is used to catalyze the hydrocarbon conversion reaction which is conducted in the apparatus 110. As one of skill in the art will appreciate, the boundary between the catalyst retention zone 162 and the catalyst return 150 is fluid and depends, at least in part, on the level of catalyst contained in the catalyst retention zone 162 and the catalyst return 150.

A fluid distributor 170 is also positioned in or near the base 160 of the apparatus 110. The fluid distributor 170 includes a conduit 172 into which a fluidizing fluid is fed into catalyst retention zone 162 to fluidize a fluidizable catalyst contained in the catalyst retention zone 162 and the catalyst returns 150. Additional fluid distributors 170, as shown in FIG. 2, may also be positioned on the catalyst return(s) 150 to provide additional fluidizing fluid in the catalyst return(s) 150.

The hydrocarbon conversion apparatus 110 may also include an outlet 180 through which the catalyst can be removed from the apparatus 10. The outlet 180 is positioned adjacent the quiescent zone 128 in the second end 126 of the shell 120. It is desirable for the outlet 180 to positioned such that catalyst can be removed from the shell 120 through the quiescent zone 128. The apparatus 110 may also include an inlet 182 through which the catalyst may be placed into the apparatus 110. Although the inlet 182 is shown as being positioned on the second end 126 of the shell 120, the inlet 182 may be positioned at any position on the apparatus 110. Lines 184 are provided to remove products and unreacted feed, if any, from the separation zone 122 of the hydrocarbon conversion apparatus 110.

A series of separation devices 186 are shown as being positioned in the separation zone 122 of shell 120. The separation devices 186 may be cyclonic separators, filters, screens, impingement devices, plates, cones or any other devices which would separate the catalyst from the product of the conversion reaction.

An impingement device 190 is positioned in the first end 124 of the shell 120. The impingement device 190 is provided to direct catalyst leaving the riser reactors 130 away from the second ends 134 of the riser reactors 130 and to limit the amount of catalyst falling back into the riser reactors 130. Desirably, the impingement device 190 is positioned opposite the second ends 134 of the riser reactors 130.

A series of supports 192 are also shown in FIG. 2. The supports 192 are merely shown to be illustrative of one possible means for supporting the hydrocarbon conversion apparatus 110.

As one of skill in the art will appreciate, the hydrocarbon conversion apparatus shown in FIG. 2 functions similarly to that shown in FIG. 1 and will not be discussed in detail except to illustrate those features not shown in FIG. 1.

With reference to FIG. 2, catalyst is provided to the catalyst retention zone 162 and is fluidized in the catalyst retention zone 162 and the catalyst returns 150 by the fluidizing fluid provided through the fluid distributor 170. The feed is provided to the riser reactors 130 through the feed distributor 140. The amount of feed provided to each of the riser reactors 130 is the same as that described above in conjunction with the description of FIG. 1. The catalyst and feed flow upwardly through the riser reactors 130, in the same manner as described above in conjunction with the description of then riser reactors 20 in FIG. 1.

With continuing reference to FIG. 2, the catalyst, product and unreacted feed, if any, exit through the second ends 134 of the riser reactors 130 into the separation zone 122 of the shell 120. At least a portion, and desirably most, of the catalyst contacts the impingement device 190 and is deflected toward the sides of the shell 120. The separators 186 separate at least a portion of the catalyst from the product and unreacted feed. The product and unreacted feed are removed from the shell 120 of the hydrocarbon conversion device 10 through the lines 184. The catalyst, which is separated by the separators 186, falls into the quiescent zone 128. The remainder of the catalyst is returned to contact the feed through the catalyst returns 150.

A portion of the catalyst contained in the quiescent zone 128 can be removed from the hydrocarbon conversion apparatus 10 and be sent to a catalyst regeneration apparatus via outlet 180, such as catalyst regeneration apparatus 90 shown in FIG. 1, or removed from the hydrocarbon conversion apparatus 110 for further processing. Additionally, catalyst in the quiescent zone 128 may spill over into the catalyst returns 150 and be returned to contact the feed.

Figure 3:
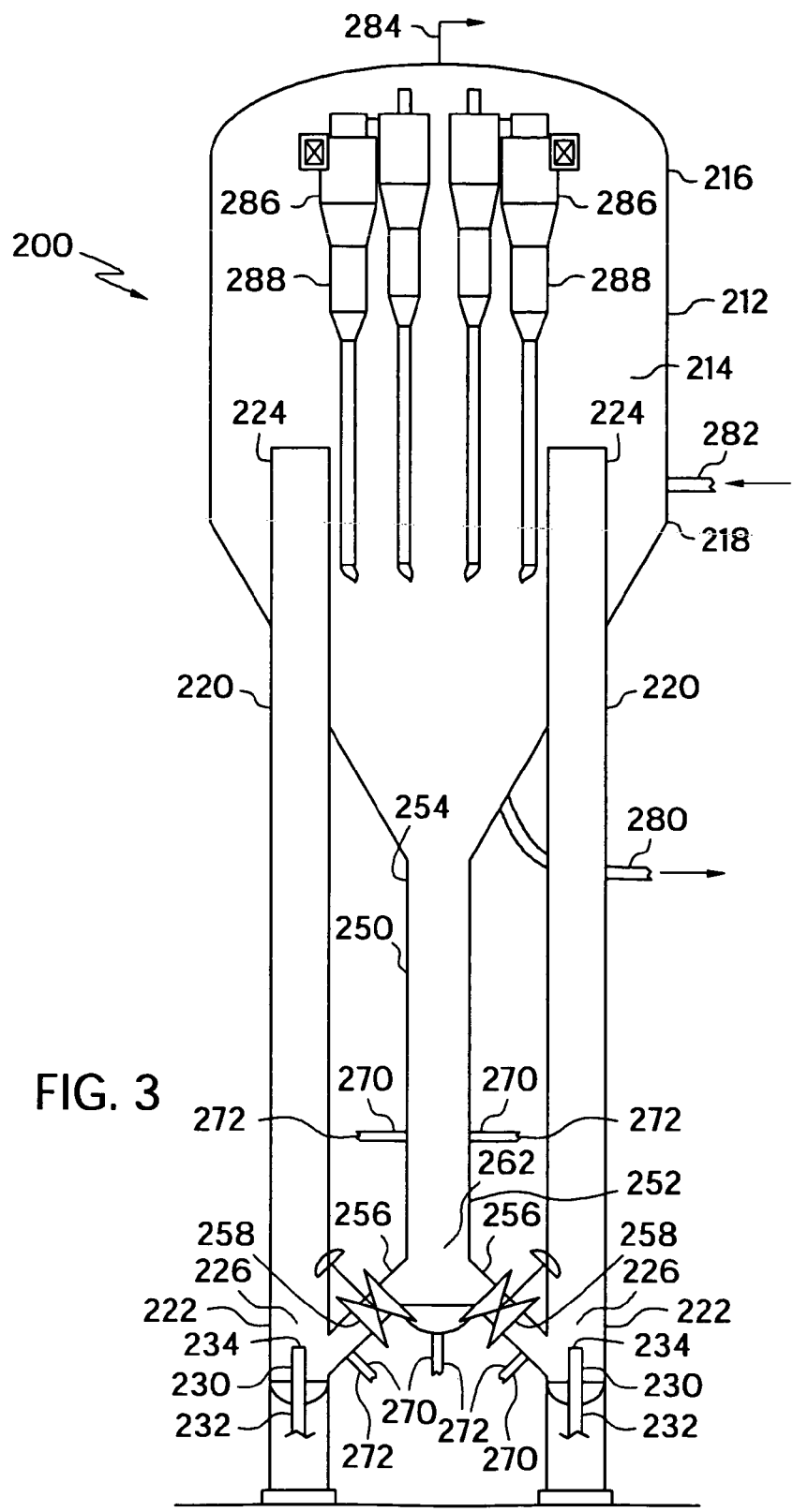
FIG. 3 presents a partial cross sectional view of yet another embodiment of the hydrocarbon conversion apparatus of the present invention.

Another embodiment of the hydrocarbon conversion apparatus of the present invention is shown in FIG. 3. The apparatus 200 comprises a shell 212, a plurality of riser reactors 220, feed distributors 230, and a catalyst return 250.

With continuing reference to FIG. 3, the shell 212 defines a separation zone 214 in which a product of the hydrocarbon conversion reaction is separated from the catalyst which catalyzes the hydrocarbon conversion reaction. Shell 212 includes a first end 216 and a second end 218.

Riser reactors 220 extend into shell 212 and the separation zone 214. Each riser reactor 220 includes a first end 222 into which the catalyst and feed are fed to conduct the hydrocarbon conversion reaction. Each riser reactor 220 further includes a second end 224 through which the catalyst, product, and unreacted feed, if any, exit the riser reactor 220.

The first end 222 of each riser reactor 220 terminates in a mouth 226 through which the catalyst and feed are fed into the riser reactor 220. The number and dimensions of the riser reactors 220 is discussed above in conjunction with the description of FIG. 1.

With continuing reference to FIG. 3, to provide a feed to the riser reactors 220, at least one feed distributor 230 is positioned near the first ends 222 of the riser reactors 220. More than one feed distributor 230 may employed to provide feed in various states, e.g., one feed distributor 230 may provide feed in a vapor form while a second feed distributor 230 may provide feed in a liquid form. Each feed distributor includes a body, not shown, from which at least one neck 232 extends. Each riser reactor 220 has at least one associated neck 232. Each feed distributor 230 terminates in a head 234. Each head 234 is positioned adjacent to the first end 222 of each riser reactor 220. Desirably, each head 234 extends upwardly into each riser reactor 220. More desirably, each head 234 is positioned at or above the mouth 226 of the first end 222 of each riser reactor 220. Feed distributor 230 may include an optional flow control device, not shown, positioned on feed distributor 230 to provide an equal amount of feed to each head 234. The flow control device can also be employed to measure flow as well. Further, a nozzle, not shown, may be positioned on each head 234 to further control the distribution of the feed to each riser reactor 220. Additionally, each head 234 may be fitted with screening device, not shown, to prevent back flow of catalyst into any of the feed distributors 230.

In the hydrocarbon conversion apparatus 200 shown in FIG. 3, a single catalyst return 250 is positioned centrally in relation to the riser reactors 220. The catalyst return 250 provides fluid communication between the separation zone 214 of the shell 212 and the riser reactors 220. The catalyst return 250 has a first end 252 and a second end 254. The first end 252 of the catalyst return 250 opens into the first end 214 of shell 212 and the second end 254 of catalyst return 250 opens to the riser reactors 220. A series of arms 256 are positioned on the second end 254 of the catalyst return 250. The arms 256 extend from the catalyst return 250 to each of the riser reactors 220 and provide fluid communication between the catalyst return 250 and the riser reactors 220. The number of arms 256 will correspond to the number of riser reactors 220 with each riser reactor 230 having at least one corresponding arm 256. The catalyst return 250 is provided to transport catalyst from the separation zone 214 of shell 212 to the first ends 222 of the riser reactors 220. Flow of catalyst through the catalyst return 250 may optionally be controlled through the use of a flow control device 258 positioned on the catalyst return 250 or on each arm 256. The flow control device(s) 258 can be any type of flow control devices currently in use in the art to control catalyst flow through catalyst transfer lines. If employed, the flow control device 258 is desirably a ball valve, a plug valve or a slide valve.

In the embodiment shown in FIG. 3, the first end 252 of the catalyst return 250 and the arms 256 define a catalyst retention zone 262. The arms 256 of the catalyst return 250 open to the catalyst retention zone 262. The catalyst retention zone 262 is provided to retain catalyst which is used to catalyze the hydrocarbon conversion reaction which is conducted in the apparatus 200. As one of skill in the art will appreciate, the boundary between the catalyst retention zone 262 and the catalyst return 250 is fluid and depends, at least in part, on the level of catalyst contained in the catalyst retention zone 262 and the arms 256 of the catalyst return 250.

At least one fluid distributor 270 is positioned beneath the catalyst retention zone 262. The fluid distributor 270 includes a conduit 272 into which a fluidizing fluid is fed to fluidize a fluidizable catalyst in the catalyst retention zone 262 and the catalyst return 250. Additional fluid distributors 270, as shown in FIG. 3, may also be positioned on the catalyst return 250 to further fluidize fluidizable catalyst contained in the catalyst return 250.

The hydrocarbon conversion apparatus 200 may also include an outlet 280 through which the catalyst can be removed from the apparatus 200. The outlet 280 is shown as being positioned on the second end 218 of the shell 212 but may be positioned at any position on the apparatus 200. The apparatus 200 may also include an inlet 282 through which the catalyst may be placed into the apparatus 200. Although the inlet 282 is shown as being positioned on the second end 218 of the shell 212, the inlet 282 may be positioned at any position on the apparatus 200. A line 284 may be provided to remove products from the apparatus 200.

A series of separation devices 286 are shown as being positioned in the separation zone 214 of shell 212. The separation devices 286 may be cyclonic separators, filters, screens, impingement devices, plates, cones or any other devices which would separate the catalyst from the product of the conversion reaction. The separation devices 286 are shown in FIG. 3 as cyclonic separators 288.

A series of supports 292 are also shown in FIG. 3. The supports 292 are merely shown to be illustrative of one possible means for supporting the hydrocarbon conversion apparatus 200.

The hydrocarbon conversion apparatus 200 which is shown in FIG. 3 functions similarly to that shown in FIGS. 1 and 2. The apparatus 200 shown in FIG. 3 functions in the following manner.

The apparatus 200 is filled with an appropriate amount of catalyst which is retained in the catalyst return 250 and the catalyst retention zone 262. The catalyst is fluidized in the catalyst return 250 and the catalyst retention zone 262 by means of a fluidizing fluid which is provided to the hydrocarbon conversion apparatus 200 through the conduits 272 of the fluid distributors 270. The flow of catalyst to the riser reactors 220 can be controlled by the flow control devices 258. Feed is provided to the riser reactors 220 through the feed distributors 230. The amount of feed provided to the riser reactors 220 is the same as that discussed above in conjunction with the description of FIG. 1. The feed and the catalyst flow upwardly in the riser reactors 230 by the principle of eduction which is also described above.

The catalyst, product and unreacted feed, if any, exit the riser reactors 220 through their second ends 224. The catalyst is separated from the product and any unreacted feed by the separation devices 286. The separated catalyst is fed to the second end 218 of shell 212 while the product and any unreacted feed are removed from the apparatus through the line 284.

A portion of the catalyst may be removed from the apparatus 200 through the outlet 280 and sent to a regeneration apparatus, not shown, or removed entirely from the apparatus 200. The regenerated catalyst is returned to the apparatus 200 through the inlet 282.

The separated catalyst enters the first end 252 of the catalyst return 250 and is recycled to be reused in the hydrocarbon conversion reaction. The catalyst is returned through the catalyst return 250 to the catalyst containment area 262 where the catalyst is maintained in a fluidized state by the fluidizing fluid provided through the fluid distributors 270.

Figure 4:
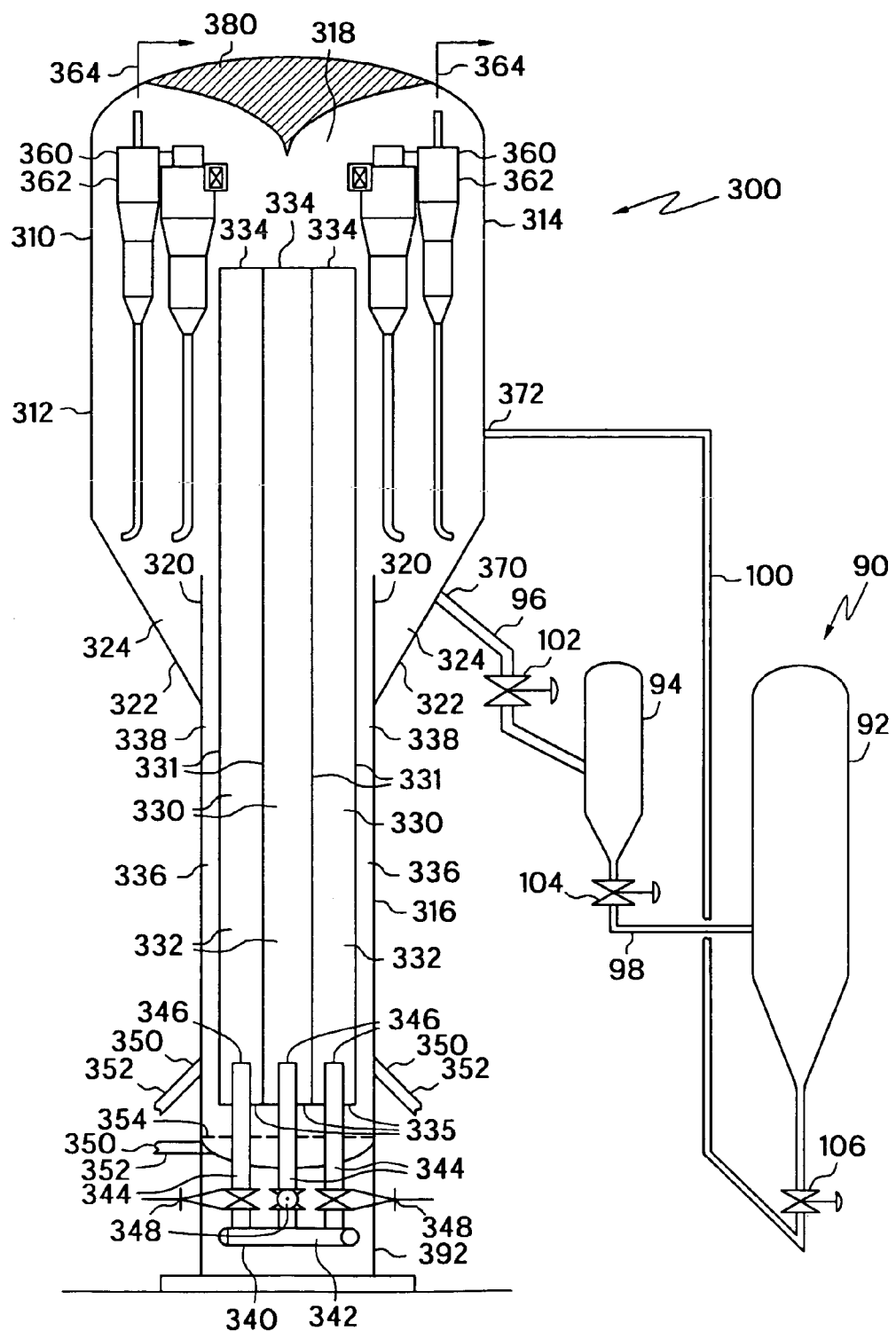
FIG. 4 presents a partial cross sectional view of still another embodiment of the hydrocarbon conversion apparatus of the present invention.

Another embodiment of the hydrocarbon conversion apparatus 300 is shown in FIG. 4. The apparatus 300 comprises a shell 310, a plurality of riser reactors 330, a feed distributor 340 and a fluid distributor 350.

With continued reference to FIG. 4, the shell 310 is formed by a wall 312 and is hollow. Shell 310 has a first end 314 and a second end 316. The first end 314 of shell 310 defines a separation zone 318 in which the catalyst is separated from the product of the hydrocarbon conversion reaction. The shell 310 further includes a wall extension 320, which extends upwardly into the first end 314 of shell 310 from the second end 316 of shell 310, and a funnel portion 322. The wall extension 320 and the funnel portion 322 define a quiescent zone 324 in which a portion of the catalyst can be retained prior to being removed from the shell 310.

In the embodiment shown in FIG. 4, a plurality of riser reactors 330 are positioned inside shell 310, as shown in FIG. 4. Each riser reactor 330 extends substantially parallel to a longitudinal axis of shell 310 and has a wall 331. Each riser reactor 330 has a first end 332 and a second end 334. The first end 332 of each riser reactor 330 is positioned in the second end 316 of shell 310. The second end 334 of each riser reactor 330 extends into the first end 314 of shell 310. The first end 332 of each riser reactor 330 terminates in a mouth 335 through which the catalyst and feed are fed into the riser reactor 330. Although the hydrocarbon conversion apparatus 300 is shown in FIG. 4 as containing three riser reactors 330, apparatus 300 desirably contains two or more riser reactors 330. The number and size of the riser reactors 330 is described in conjunction with the description of FIG. 1.

With continuing reference to FIG. 4, wall 312 of shell 310 and wall 331 of each of the riser reactors 330 define a catalyst retention zone 336. The catalyst retention zone 336 contains the catalyst utilized to catalyze the hydrocarbon conversion reaction. When the apparatus 300 is in operation, catalyst retention zone 336 contains the catalyst in a fluidized state, as will be described in detail below. Wall extension 320, wall 312 of the shell 310 and the walls 331 of each of the riser reactors 330 also define a catalyst return 338. The catalyst return 338 directs catalyst which has been used in a conversion reaction from the separation zone 318 in the first end 314 of the shell 310 to the catalyst retention zone 336. As one of skill in the art will appreciate, the boundary between the catalyst retention zone 336 and the catalyst return 338 is fluid and depends, at least in part, on the level of catalyst contained in the catalyst retention zone 336.

To provide a feed to the riser reactors 330, at least one feed distributor 340 is positioned near the first ends 332 of the riser reactors 330. More than one feed distributor 340 may employed to provide feed in various states, e.g., one feed distributor 340 may provide feed in a vapor form while a second feed distributor 340 may provide feed in a liquid form. Feed distributor 340 includes a body 342 from which a plurality of necks 344 extend. Each riser reactor 330 has at least one associated neck 344. Each neck 344 terminates in a head 346. Each head 346 of each neck 344 is positioned adjacent to the first end 332 of each riser reactor 330. Desirably, each head 346 extends into each riser reactor 330. More desirably, each head 346 is positioned at or above the mouth 335 at the first end 332 of each riser reactor 330. Feed distributor 340 may include an optional flow control device 348 positioned on feed distributor 340 to provide an equal amount of feed to each neck 344 and, if desired, to measure the flow through each neck 344. As shown in FIG. 4, the flow control device 348 is a valve 350. Useful types of valves are described above. Further, a nozzle, not shown, may be fitted onto each head 346 to distribute the feed into each riser reactor 330. Additionally, each head 346 may be fitted with screening device, not shown, to prevent back flow of catalyst into any of necks 344 of feed distributor 340 and, subsequently into body 342 of feed distributor 340.

A fluid distributor 350 is also positioned in second end 316 of shell 310. The fluid distributor 350 includes a conduit 352 into which a fluidizing fluid is fed to fluidize a fluidizable catalyst in the catalyst retention zone 336 and the catalyst return 338. An optional disperser 354 may be positioned between the fluid distributor 350 and the catalyst retention zone 336 to disperse the fluidizing fluid about the catalyst retention zone 336 and the catalyst return 338. Disperser 354 is desirably positioned perpendicular to the longitudinal axis of shell 310 in the second end 316 of shell 310. Disperser 354 may be a screen, a grid, a perforated plate or similar device through which the fluidizing fluid is fed to provide even distribution of the fluidizing fluid to the catalyst retention zone 336.

To separate products from the hydrocarbon conversion reaction from the catalyst, a separator 360 or series of separators 360, may be positioned in first end 314 of shell 310. The separators 360 are shown in FIG. 4 as being cyclonic separators 362. Other types of separators 360 such as filters, screens, impingement devices, plates, cones and other devices which would separate the products from the catalyst may also be positioned in the first end 314 of shell 310. The number of separators 360 depends upon the desired operating efficiency, particle size of the catalyst, the gas superficial velocity, production capacity, and other parameters. The products are removed from shell 310 through a line 364 or a plurality of lines 364 for further processing such as, for example, separation and purification.

The apparatus 300 may further include an outlet 370 through which catalyst may be removed from the shell 310 and an inlet 372 through is which catalyst may be placed into shell 310. The positioning of outlet 370 and inlet 372 is not critical. However, it is desirable for the outlet 370 to be positioned such that catalyst can be removed from the shell 310 through the quiescent zone 324.

An impingement device 380 is positioned in the first end 314 of the shell 310. The impingement device 380 is provided to direct catalyst leaving the riser reactors 330 away from the second ends 334 of the riser reactors 330 and to limit the amount of catalyst falling back into the riser reactors 330.

A support 392 is also shown in FIG. 2. The support 392 is merely shown to be illustrative of one possible means for supporting the hydrocarbon conversion apparatus 300.

As shown in FIG. 4, the hydrocarbon conversion apparatus 300 may optionally include an associated catalyst regeneration apparatus 90 which is in fluid communication with the hydrocarbon conversion apparatus 300. The catalyst regeneration apparatus 90 includes a catalyst regenerator 92, which is in fluid communication with the hydrocarbon conversion apparatus 300 and an optional catalyst stripper 94, which is in fluid communication with the catalyst regenerator 92 and which may be in fluid communication with the hydrocarbon conversion apparatus 300. A first line 96 provides fluid communication between the catalyst stripper 94 and shell 310 through outlet 370. A second line 98 provides fluid communication between the catalyst stripper 94 and the catalyst regenerator 92. A third line 100 provides fluid communication between the catalyst regenerator 92 and the inlet 372 on shell 310. A flow control device 102 may optionally be positioned on first line 96 to control the flow of catalyst between the shell 12 and the catalyst stripper 94. A flow control device 104 may optionally be positioned on second line 98 to control the flow of catalyst between the catalyst stripper 94 and the catalyst regenerator 92. Finally, a flow control device 106 may be positioned on third line 100 to control the flow of catalyst between the catalyst regenerator 92 and the shell 310. The flow control devices 102, 104 and 106 can be any flow control-device currently in use in the art to control catalyst flow through catalyst transfer lines. Useful flow control devices include ball valves, plug valves and slide valves. Although the catalyst stripper 94 is shown on FIG. 4 as being separate from the catalyst regenerator 92, one skilled in the art will appreciate that the catalyst stripper 94 may be integrally formed with the catalyst regenerator 92. One skilled in the art will also appreciate that, although FIG. 4 shows third line 100 as returning the catalyst to the separation zone 318 through line 372, the catalyst may also be returned to the catalyst return 338, the catalyst retention zone 336 and combinations of the separation zone 318, the catalyst return 338 and the catalyst retention zone 336.

When in operation, the hydrocarbon conversion apparatus 300, as shown in FIG. 4, functions in the following manner. The catalyst retention zone 336 is filled with a catalyst suitable to carry out the desired hydrocarbon conversion reaction. The catalyst should be of a type which is fluidizable. To fluidize the catalyst in the catalyst retention zone 336 and the catalyst return 338, a fluidizing fluid is fed into the fluid distributor 350 through conduit 352. The fluidizing fluid is dispersed within the shell 310 of the hydrocarbon conversion apparatus 300 by the disperser 354. Useful fluidizing fluids include, but are not limited to, nitrogen, steam, carbon dioxide, hydrocarbons, and air. The choice of fluidizing fluid depends upon the type of conversion reaction being conducted in the hydrocarbon conversion apparatus 300.

Once the catalyst has reached an acceptable fluidized state, a feed is fed into the hydrocarbon conversion apparatus 300 through feed distributor 340. The feed enters the body 342 of feed distributor 340, passes through the necks 344 of feed distributor 340 and exits through the heads 346 of feed distributor 340. The feed is distributed to each of the riser reactors 330 through the mouths 335 at the first ends 332 of the riser reactors 330.

A pressure differential created by the velocity of the feed entering the first ends 332 of the riser reactors 330 and the pressure of the height of fluidizable catalyst in the catalyst retention zone 336 causes catalyst to be aspirated into the first ends 332 of the riser reactors 330. The catalyst is transported through the riser reactors 330 under well known principles of eduction in which the kinetic energy of one fluid, in this case the feed, is used to move another fluid, in this case the fluidized catalyst. The catalyst and feed travel from the first ends 332 to the second ends 334 of the riser reactors 330. As the catalyst and feed travel through the riser reactors 330, the hydrocarbon conversion reaction occurs and a conversion product is produced.

The conversion product(s), unreacted feed, if any, and the catalyst exit the riser reactors 330 through their second ends 334 and enter the catalyst separation zone 318 in the first end 314 of shell 310. In the catalyst separation zone 318, the conversion product and unreacted feed, if any, are separated from the catalyst by the separator 360. Desirably, the conversion product and unreacted feed, if any, are separated by a series of cyclonic separators 362 as shown in FIG. 4. Further, at least a portion of the catalyst exiting the riser reactors 330 contacts the impingement device 380 and is deflected away from the second ends 334 of the riser reactors 330 to the quiescent zone 324.

Once the catalyst has been separated from the conversion product and the unreacted feed, if any, are removed from the shell 310 through the lines 364 for further processing such as separation and purification. A portion of the catalyst falls to the quiescent zone 324 in which the catalyst is retained until it is removed from the shell 310. The catalyst is removed from the quiescent zone 324 through outlet 370 and can be sent for regeneration in the catalyst regeneration apparatus 90. The function of the catalyst regeneration apparatus 90 is discussed above in conjunction with the description of FIG. 1 and will not be discussed in further detail here. A portion of the catalyst in the quiescent zone 324 will fall out of the quiescent zone 324 into the catalyst return 338 and be returned to contact the feed.

Returning to FIG. 4, the remaining portion of the catalyst, after being separated from the products and unreacted feed, falls from the first end 314 of shell 310 through the catalyst return 338 to the catalyst retention zone 336. From the catalyst retention zone 336, the catalyst is recycled for use in the hydrocarbon conversion reaction.

Representative embodiments of possible configurations of riser reactors and catalyst returns are shown in cross section in FIG. 5. FIG. 5A shows a possible configuration for the riser reactors 20 for the hydrocarbon conversion apparatus 10 shown in FIG. 1. As shown in FIG. 5A, the riser reactors 20 are contained within a shell 26. If contained within a shell 26, the area between the riser reactors and the shell 26 is filled with refractory material 28. Useful refractory materials 28 include sand, cement, ceramic materials, high alumina bricks containing mullite or corundum, high silica bricks, magnesite bricks, insulating firebrick of clay or kaolin or any other high temperature resistant material.

Figure 5D:
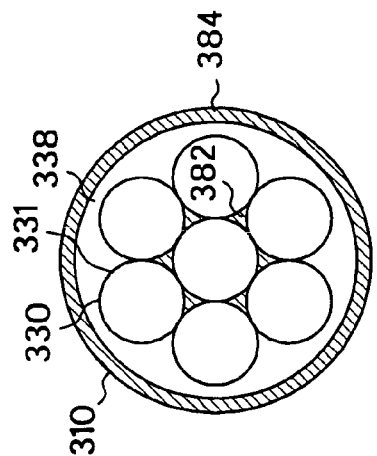
FIG. 5 presents cross sectional views of representative arrangements and configurations of the riser reactors and catalyst returns.
Figure 5E:
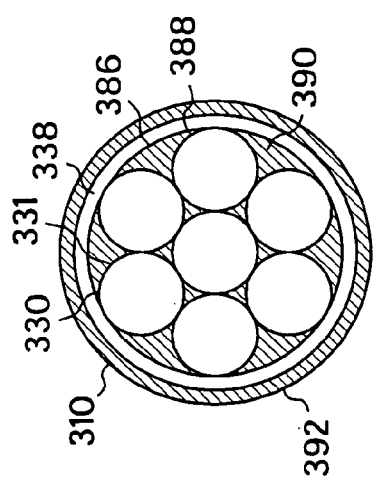
Figure 5A:
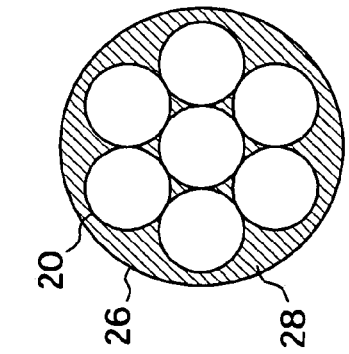
Figure 5C:
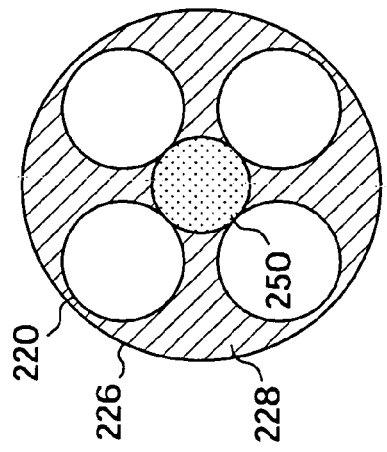
Figure 5B:
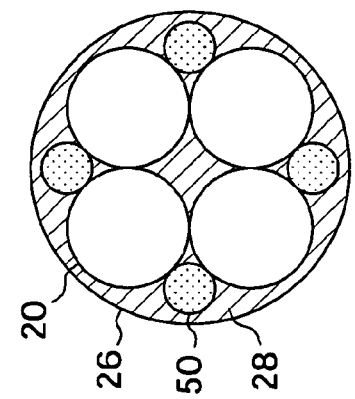

FIG. 5B shows a cross section of a hydrocarbon conversion apparatus similar to apparatus 10 shown in FIG. 1. In this embodiment, the riser reactors 20 are again contained within a shell 26. The shell 26 is filled with refractory material 28 as described above. In this embodiment, the catalyst returns are also contained within the shell 26 and surrounded by the refractory material 28.

FIG. 5C shows a possible configuration for the riser reactors 220 shown in FIG. 3. In the embodiment shown in FIG. 5C, the catalyst return 250 is shown as being centrally positioned in relation to the riser reactors 220. The riser reactors 220 and the catalyst return 250 are contained within a shell 226. The area between the riser reactors and the shell 226 is filled with refractory material 228. Useful refractory materials are described above in conjunction with the description of FIG. 5A.

FIG. 5D shows a possible configuration for the riser reactors 330 shown in FIG. 4. As shown in FIG. 5D, the riser reactors 330 are centrally located within the shell 310. As described above in conjunction with the description of FIG. 4, the walls 331 of the riser reactors 330 and the shell 310 define the catalyst return 338. The area between the riser reactors 330 can optionally be filled with a first refractory material 382. The shell 310 may also be optionally filled with a second refractory material 384. Useful refractory materials are described above in conjunction with the description of FIG. 5A. With continuing reference to FIG. 5D, a person of skill in the art will appreciate that the first refractory material 382 and the second refractory material 384 can be the same or different material.

FIG. 5E shows another possible configuration for the riser reactors 330 shown in FIG. 4. As shown in FIG. 5E, the riser reactors 330 are centrally located within the shell 310. In this embodiment, the riser reactors 330 are contained within a second shell 386 which has a wall 388. The catalyst return 338 is defined by the wall 388 of the second shell 386 and the shell 310. The areas between the walls 331 of the riser reactors 330 and the wall 388 of the second shell 386 are filled with a first refractory material 390. The shell 310 may also be filled with a second refractory material 392. Useful refractory materials are described above in conjunction with the description of FIG. 5A. With continuing reference to FIG. 5E, a person of skill in the art will appreciate that the first refractory material 390 and the second refractory material 392 can be the same or different material.

While the riser reactors and catalyst returns are shown in the various Figures as having a circular cross section, the riser reactors and catalyst returns may have any cross section which would facilitate operation of the hydrocarbon conversion apparatus. Other useful cross sections for the riser reactors and the catalyst returns include elliptical cross sections, polygonal cross sections and cross sections of sections of ellipses and polygons. Desirable cross-sections for the riser reactors and catalyst returns include circles and regular polygons with sides of equal lengths. By "regular", it is meant that the shape of the cross-section has no line segments with vertices, inside the boundaries of the shape, having angles greater than 180°. The most desirable cross-sections are circles, and triangles, squares, and hexagons with sides of equal length. The means of determining cross-sectional areas for any cross-section shape is based on long established geometric principles well known to those skilled in the art. Similarly, desirable cross-sections for the separation zone include circles and regular polygons with sides of equal lengths. The most desirable cross-sections are circles, and triangles, squares, and hexagons with sides of equal length.

While the position of the riser reactors relative to the separation zone are shown in the figures as equidistant and symmetrical, alternate configurations are within the scope of the present invention. For example, the riser reactors may be positioned on one side of the separation zone in a hemispherical layout. As another example, when the separation zone has a circular or approximately circular cross-section, the riser reactors may be positioned in a line along the diameter the separation zone. One skilled in the art will appreciate that a wide variety of configurations of the risers relative to the separation zone may be utilized in the present invention.

One skilled in the art will further appreciate that the multiple riser reactors of the hydrocarbon conversion apparatus of the present invention may be formed by dividing a single riser reactor into a plurality of smaller riser reactors. For example, a larger, reactor having a circular cross section could be divided into several pie-shaped riser reactors. As another example, a riser reactor having a square cross section could be divided into a plurality of riser reactors having either rectangular or smaller square cross sections.

The hydrocarbon conversion apparatus of the present invention is useful to conduct most any hydrocarbon conversion process in which a fluidized catalyst is employed. Typical reactions include, for example, olefin interconversion reactions, oxygenate to olefin conversion reactions, oxygenate to gasoline conversion reactions, malaeic anhydride formulation, vapor phase methanol synthesis, phthalic anhydride formulation, Fischer Tropsch reactions, and acrylonitrile formulation.

The hydrocarbon conversion apparatus of the present invention is particularly suited for conducting an oxygenate to olefin conversion reaction. In an oxygenate to olefin conversion reaction, an oxygenate is converted to an olefin by contacting an oxygenate feed with a catalyst under conditions sufficient to convert the oxygenate to an olefin.

The process for converting oxygenates to light olefins employs a feed including an oxygenate. As used herein, the term "oxygenate" is defined to include, but is not necessarily limited to, hydrocarbons containing oxygen such as the following: aliphatic alcohols, ethers, carbonyl compounds (aldehydes, ketones, carboxylic acids, carbonates, and the like), and mixtures thereof. The aliphatic moiety desirably should contain in the range of from about 1–10 carbon atoms and more desirably in the range of from about 1–4 carbon atoms. Representative oxygenates include, but are not necessarily limited to, lower molecular weight straight chain or branched aliphatic alcohols, and their unsaturated counterparts. Examples of suitable oxygenates include, but are not necessarily limited to the following: methanol; ethanol; n-propanol; isopropanol; $C_4$–$C_{10}$ alcohols; methyl ethyl ether; dimethyl ether; diethyl ether; di-isopropyl ether; methyl formate; formaldehyde; di-methyl carbonate; methyl ethyl carbonate; acetone; and mixtures thereof. Desirably, the oxygenate used in the conversion reaction is selected from the group consisting of methanol, dimethyl ether and mixtures thereof. More desirably the oxygenate is methanol. The total charge of feed to the riser reactors may contain additional components, such as diluents.

One or more diluents may be fed to the riser reactors with the oxygenates, such that the total feed mixture comprises diluent in a range of from about 1 mol % and about 99 mol %. Diluents which may be employed in the process include, but are not necessarily limited to, helium, argon, nitrogen, carbon monoxide, carbon dioxide, hydrogen, water, paraffins, other hydrocarbons (such as methane), aromatic compounds, and mixtures thereof. Desired diluents include, but are not necessarily limited to, water and nitrogen.

A portion of the feed may be provided to the reactor in liquid form. When a portion of the feed is provided in a liquid form, the liquid portion of the feed may be either oxygenate, diluent or a mixture of both. The liquid portion of the feed may be directly injected into the individual riser reactors, or entrained or otherwise carried into the riser reactors with the vapor portion of the feed or a suitable carrier gas/diluent. By providing a portion of the feed (oxygenate and/or diluent) in the liquid phase, the temperature in the riser reactors can be controlled. The exothermic heat of reaction of oxygenate conversion is partially absorbed by the endothermic heat of vaporization of the liquid portion of the feed. Controlling the proportion of liquid feed to vapor feed fed to the reactor is one possible method for controlling the temperature in the reactor and in particular in the riser reactors.

The amount of feed provided in a liquid form, whether fed separately or jointly with the vapor feed, is from about 0.1 wt. % to about 85 wt. % of the total oxygenate content plus diluent in the feed. More desirably, the range is from about 1 wt. % to about 75 wt. % of the total oxygenate plus diluent feed, and most desirably the range is from about 5 wt. % to about 65 wt. %. The liquid and vapor portions of the feed may be the same composition, or may contain varying proportions of the same or different oxygenates and same or different diluents. One particularly effective liquid diluent is water, due to its relatively high heat of vaporization, which allows for a high impact on the reactor temperature differential with a relatively small rate. Other useful diluents are described above. Proper selection of the temperature and pressure of any appropriate oxygenate and/or diluent being fed to the reactor will ensure at least a portion is in the liquid phase as it enters the reactor and/or comes into contact with the catalyst or a vapor portion of the feed and/or diluent.

Optionally, the liquid fraction of the feed may be split into portions and introduced to riser reactors a multiplicity of locations along the length of the riser reactors. This may be done with either the oxygenate feed, the diluent or both. Typically, this is done with the diluent portion of the feed. Another option is to provide a nozzle which introduces the total liquid fraction of the feed to the riser reactors in a manner such that the nozzle forms liquid droplets of an appropriate size distribution which, when entrained with the gas and solids introduced to the riser reactors, vaporize gradually along the length of the riser reactors. Either of these arrangements or a combination thereof may be used to better control the temperature differential in the riser reactors. The means of introducing a multiplicity of liquid feed points in a reactor or designing a liquid feed nozzle to control droplet size distribution is well known in the art and is not discussed here.

The catalyst suitable for catalyzing an oxygenate-to-olefin conversion reaction includes a molecular sieve and mixtures of molecular sieves. Molecular sieves can be zeolitic (zeolites) or non-zeolitic (non-zeolites). Useful catalysts may also be formed from mixtures of zeolitic and non-zeolitic molecular sieves. Desirably, the catalyst includes a non-zeolitic molecular sieve. Desired molecular sieves for use with an oxygenate to olefins conversion reaction include "small" and "medium" pore molecular sieves. "Small pore" molecular sieves are defined as molecular sieves with pores having a diameter of less than about 5.0 Angstroms. "Medium pore" molecular sieves are defined as molecular sieves with pores having a diameter from about 5.0 to about 10.0 Angstroms.

Useful zeolitic molecular sieves include, but are not limited to, mordenite, chabazite, erionite, ZSM-5, ZSM-34, ZSM-48 and mixtures thereof. Methods of making these molecular sieves are known in the art and need not be discussed here. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof. Structural types of medium pore molecular sieves that are suitable for use in this invention include MFI, MEL, MTW, EUO, MTT, HEU, FER, AFO, AEL, TON, and substituted forms thereof.

Silicoaluminophosphates ("SAPOs") are one group of non-zeolitic molecular sieves that are useful in an oxygenate to olefins conversion reaction. SAPOs comprise a three-dimensional microporous crystal framework structure of $[SiO_2]$, $[AlO_2]$ and $[PO_2]$ tetrahedral units. The way Si is incorporated into the structure can be determined by $^{29}Si$ MAS NMR. See Blackwell and Patton, J. Phys. Chem., 92, 3965 (1988). The desired SAPO molecular sieves will exhibit one or more peaks in the $^{29}Si$ MAS NMR, with a chemical shift [(Si)] in the range of −88 to −96 ppm and with a combined peak area in that range of at least 20% of the total peak area of all peaks with a chemical shift [(Si)] in the range of −88 ppm to −115 ppm, where the [(Si)] chemical shifts refer to external tetramethylsilane (TMS).

It is desired that the silicoaluminophosphate molecular sieve used in such a process have a relatively low $Si/Al_2$ ratio. In general, the lower the $Si/Al_2$ ratio, the lower the $C_1$–$C_4$ saturates selectivity, particularly propane selectivity. A $Si/Al_2$ ratio of less than 0.65 is desirable, with a $Si/Al_2$ ratio of not greater than 0.40 being preferred, and a $SiAl_2$ ratio of not greater than 0.32 being particularly preferred.

Silicoaluminophosphate molecular sieves are generally classified as being microporous materials having 8, 10, or 12 membered ring structures. These ring structures can have an average pore size ranging from about 3.5–15 angstroms. Preferred are the small pore SAPO molecular sieves having an average pore size ranging from about 3.5 to 5 angstroms, more preferably from 4.0 to 5.0 angstroms. These pore sizes are typical of molecular sieves having 8 membered rings.

In general, silicoaluminophosphate molecular sieves comprise a molecular framework of corner-sharing $[SiO_2]$, $[AlO_2]$, and $[PO_2]$ tetrahedral units. This type of framework is effective in converting various oxygenates into olefin products.

Suitable silicoaluminophosphate molecular sieves for use in an oxygenate to olefin conversion process include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof. Preferred are SAPO-18, SAPO-34, SAPO-35, SAPO-44, and SAPO-47, particularly SAPO-18 and SAPO-34, including the metal containing forms thereof, and mixtures thereof. As used herein, the term mixture is synonymous with combination and is considered a composition of matter having two or more components in varying proportions, regardless of their physical state.

Additional olefin-forming molecular sieve materials can be mixed with the silicoaluminophosphate catalyst if desired. Several types of molecular sieves exist, each of which exhibit different properties. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof. Structural types of medium pore molecular sieves that are suitable for use in this invention include MFI, MEL, MTW, EUO, MTT, HEU, FER, AFO, AEL, TON, and substituted forms thereof. Preferred molecular sieves which can be combined with a silicoaluminophosphate catalyst include ZSM-5, ZSM-34, erionite, and chabazite.

Substituted SAPOs form a class of molecular sieves known as "MeAPSOs," which are also useful in the present invention. Processes for making MeAPSOs are known in the art. SAPOs with substituents, such as MeAPSOs, also may be suitable for use in the present invention. Suitable substituents, "Me," include, but are not necessarily limited to, nickel, cobalt, manganese, zinc, titanium, strontium, magnesium, barium, and calcium. The substituents may be incorporated during synthesis of the MeAPSOs. Alternately, the substituents may be incorporated after synthesis of SAPOs or MeAPSOs using many methods. These methods include, but are not necessarily limited to, ion-exchange, incipient wetness, dry mixing, wet mixing, mechanical mixing, and combinations thereof.

Desired MeAPSOs are small pore MeAPSOs having pore size smaller than about 5 Angstroms. Small pore MeAPSOs include, but are not necessarily limited to, NiSAPO-34, CoSAPO-34, NiSAPO-17, CoSAPO-17, and mixtures thereof.

Aluminophosphates (ALPOs) with substituents, also known as "MeAPOs," are another group of molecular sieves that may be suitable for use in an oxygenate to olefin conversion reaction, with desired MeAPOs being small pore MeAPOs. Processes for making MeAPOs are known in the art. Suitable substituents include, but are not necessarily limited to, nickel, cobalt, manganese, zinc, titanium, strontium, magnesium, barium, and calcium. The substituents may be incorporated during synthesis of the MeAPOs. Alternately, the substituents may be incorporated after synthesis of ALPOs or MeAPOs using many methods. The methods include, but are not necessarily limited to, ion-exchange, incipient wetness, dry mixing, wet mixing, mechanical mixing, and combinations thereof.

The molecular sieve may also be incorporated into a solid composition, preferably solid particles, in which the molecular sieve is present in an amount effective to catalyze the desired conversion reaction. The solid particles may include a catalytically effective amount of the molecular sieve and matrix material, preferably at least one of a filler material and a binder material, to provide a desired property or properties, e.g., desired catalyst dilution, mechanical strength and the like, to the solid composition. Such matrix materials are often to some extent porous in nature and often have some nonselective catalytic activity to promote the formation of undesired products and may or may not be effective to promote the desired chemical conversion. Such matrix, e.g., filler and binder, materials include, for example, synthetic and naturally occurring substances, metal oxides, clays, silicas, aluminas, silica-aluminas, silica-magnesias, silica-zirconias, silica-thorias, silica-beryllias, silica-titanias, silica-alumina-thorias, silica-aluminazirconias, and mixtures of these materials.

The solid catalyst composition preferably comprises about 1% to about 99%, more preferably about 5% to about 90%, and still more preferably about 10% to about 80%, by weight of molecular sieve; and an amount of about 1% to about 99%, more preferably about 5% to about 90%, and still more preferably about 10% to about 80%, by weight of matrix material.

The preparation of solid catalyst compositions, e.g., solid particles, comprising the molecular sieve and matrix material, is conventional and well known in the art and, therefore, is not discussed in detail here.

The catalyst may further contain binders, fillers, or other material to provide better catalytic performance, attrition resistance, regenerability, and other desired properties. Desirably, the catalyst is fluidizable under the reaction conditions. The catalyst should have particle sizes of from about 20μ to about 3,000μ, desirably from about 30μ to about 200μ, and more desirably from about 50μ to about 150μ. The catalyst may be subjected to a variety of treatments to achieve the desired physical and chemical characteristics. Such treatments include, but are not necessarily limited to, calcination, ball milling, milling, grinding, spray drying, hydrothermal treatment, acid treatment, base treatment, and combinations thereof.

Desirably, in an oxygenate to olefin conversion reaction conducted in the hydrocarbon conversion apparatus of the present invention employs a gas superficial velocity in the riser reactors of greater than 1 meter per second (m/s). As used herein and in the claims, the term, "gas superficial velocity," is defined as the volumetric flow rate of vaporized feedstock, and any diluent, divided by the reactor cross-sectional area. Because the oxygenate is converted to a product including a light olefin while flowing through the reactor, the gas superficial velocity may vary at different locations within the reactor depending on the total number of moles of gas present and the cross section of a particular location in the reactor, temperature, pressure, and other relevant reaction parameters. The gas superficial velocity, including any diluents present in the feedstock, is maintained at a rate greater than 1 meter per second (m/s) at any point in the reactor. Desirably, the gas superficial velocity is greater than about 2 m/s. More desirably, the gas superficial velocity is greater than about 2.5 m/s. Even more desirably, the gas superficial velocity is greater than about 4 m/s. Most desirably, the gas superficial velocity is greater than about 8 m/s.

Maintaining the gas superficial velocity at these rates increases the approach to plug flow behavior of the gases flowing in the riser reactors. As the gas superficial velocity increases above 1 m/s, a reduction in axial diffusion or back mixing of the gases results from a reduction in internal recirculation of solids, which carry gas with them. (Ideal plug flow behavior occurs when elements of the homogeneous fluid reactant move through a reactor as plugs moving parallel to the reactor axis). Minimizing the back mixing of the gases in the reactor increases the selectivity to the desired light olefins in the oxygenate conversion reaction.

When the gas superficial velocity approaches 1 m/s or higher, a substantial portion of the catalyst in the reactor may be entrained with the gas exiting the riser reactors. At least a portion of the catalyst exiting the riser reactors is recirculated to recontact the feed through the catalyst return.

Desirably, the rate of catalyst, comprising molecular sieve and any other materials such as binders, fillers, etc., recirculated to recontact the feed is from about 1 to about 100 times, more desirably from about 10 to about 80 times, and most desirably from about 10 to about 50 times the total feed rate, by weight, of oxygenates to the reactor.

The temperature useful to convert oxygenates to light olefins varies over a wide range depending, at least in part, on the catalyst, the fraction of regenerated catalyst in a catalyst mixture, and the configuration of the reactor apparatus and the reactor. Although these processes are not limited to a particular temperature, best results are obtained if the process is conducted at a temperature from about 200° C. to about 700° C., desirably from about 250° C. to about 600° C., and most desirably from about 300° C. to about 500° C. Lower temperatures generally result in lower rates of reaction, and the formation rate of the desired light olefin products may become markedly slower. However, at temperatures greater than 700° C., the process may not form an optimum amount of light olefin products, and the rate at which coke and light saturates form on the catalyst may become too high.

Light olefins will form—although not necessarily in optimum amounts—at a wide range of pressures including, but not limited to, pressures from about 0.1 kPa to about 5 MPa. A desired pressure is from about 5 kPa to about 1 MPa and most desirably from about 20 kPa to about 500 kPa. The foregoing pressures do not include that of a diluent, if any, and refer to the partial pressure of the feed as it relates to oxygenate compounds and/or mixtures thereof. Pressures outside of the stated ranges may be used and are not excluded from the scope of the invention. Lower and upper extremes of pressure may adversely affect selectivity, conversion, coking rate, and/or reaction rate; however, light olefins will still form and, for that reason, these extremes of pressure are considered part of the present invention.

A wide range of WHSVs for the oxygenate conversion reaction, defined as weight of total oxygenate fed to the riser reactors per hour per weight of molecular sieve in the catalyst in the riser reactors, function with the present invention. The total oxygenate fed to the riser reactors includes all oxygenate in both the vapor and liquid phase. Although the catalyst may contain other materials which act as inerts, fillers or binders, the WHSV is calculated using only the weight of molecular sieve in the catalyst in the riser reactors. The WHSV is desirably high enough to maintain the catalyst in a fluidized state under the reaction conditions and within the reactor configuration and design. Generally, the WHSV is from about 1 hr$^{-1}$ to about 5000 hr$^{-1}$, desirably from about 2 hr$^{-1}$ to about 3000 hr$^{-1}$, and most desirably from about 5 hr$^{-1}$ to about 1500 hr$^{-1}$. The applicants have discovered that operation of the oxygenate to olefin conversion reaction at a WHSV greater than 20 hr$^{-1}$ reduces the methane content in the product slate of the conversion reaction. Thus, the conversion reaction is desirably operated at a WHSV of at least about 20 hr$^{-1}$. For a feed comprising methanol, dimethyl ether, or mixtures thereof, the WHSV is desirably at least about 20 hr$^{-1}$ and more desirably from about 20 hr$^{-1}$ to about 300 hr$^{-1}$.

It is particularly preferred that the reaction conditions for making olefins from an oxygenate comprise a WHSV of at least about 20 hr$^{-1}$ and a Temperature Corrected Normalized Methane Selectivity (TCNMS) of less than about 0.016. As used herein, TCNMS is defined as the Normalized Methane Selectivity (NMS) when the temperature is less than 400° C. The NMS is defined as the methane product yield divided by the ethylene product yield wherein each yield is measured on or is converted to a weight % basis. When the temperature is 400° C. or greater, the TCNMS is defined by the following equation, in which T is the average temperature within the reactor in ° C:

$$TCNMS = \frac{NMS}{1 + (((T - 400)/400) \times 14.84)}.$$

Oxygenate conversion should be maintained sufficiently high to avoid the need for commercially unacceptable levels of feed recycling. While 100% oxygenate conversion is desired for the purpose of completely avoiding feed recycle, a reduction in unwanted by-products is observed to as much as about 50% of the feed can be commercially acceptable, conversion rates from about 50% to about 98% are desired. Conversion rates may be maintained in this range—50% to about 98%—using a number of methods familiar to persons of ordinary skill in the art. Examples include, but are not necessarily limited to, adjusting one or more of the following: reaction temperature; pressure; flow rate (weight hourly space velocity and/or gas superficial velocity); catalyst recirculation rate; reactor apparatus configuration; reactor configuration; feed composition; amount of liquid feed relative to vapor feed (as will be discussed below); amount of recirculated catalyst; degree of catalyst regeneration; and other parameters which affect the conversion.

During the conversion of oxygenates to light olefins, carbonaceous deposits accumulate on the catalyst used to promote the conversion reaction. At some point, the build up of these carbonaceous deposits causes a reduction in the capability of the catalyst to convert the oxygenate feed to light olefins. At this point, the catalyst is partially deactivated. When a catalyst can no longer convert an oxygenate to an olefin product, the catalyst is considered to be fully deactivated. As an optional step in an oxygenate to olefin conversion reaction, a portion of the catalyst is withdrawn from the reactor and at least a portion of the portion removed from the reactor is partially, if not fully, regenerated in a regeneration apparatus, such as regeneration apparatus 80 as shown in FIG. 4. By regeneration, it is meant that the carbonaceous deposits are at least partially removed from the catalyst. Desirably, the portion of the catalyst withdrawn from the reactor is at least partially deactivated. The remaining portion of the catalyst in the reactor is re-circulated without regeneration, as described above. The regenerated catalyst, with or without cooling, is then returned to the reactor. Desirably, the rate of withdrawing the portion of the catalyst for regeneration is from about 0.1% to about 99% of the rate of the catalyst exiting the reactor. More desirably, the rate is from about 0.2% to about 50%, and, most desirably, from about 0.5% to about 5%.

Desirably, a portion of the catalyst, comprising molecular sieve and any other materials such as binders, fillers, etc., is removed from the reactor for regeneration and recirculation back to the reactor at a rate of from about 0.1 times to about 10 times, more desirably from about 0.2 to about 5 times, and most desirably from about 0.3 to about 3 times the total feed rate of oxygenates to the reactor. These rates pertain to the catalyst containing molecular sieve only, and do not include non-reactive solids. The rate of total solids, i.e., catalyst and non-reactive solids, removed from the reactor for regeneration and recirculation back to the reactor will vary these rates in direct proportion to the content of non-reactive solids in the total solids.

Desirably, the catalyst regeneration is carried out in a regeneration apparatus in the presence of a gas comprising oxygen or other oxidants. Examples of other oxidants include, but are not necessarily limited to, singlet $O_2$, $O_3$, $SO_3$, $N_2O$, NO, $NO_2$, $N_2O_5$, and mixtures thereof. Air and air diluted with nitrogen or $CO_2$ are desired regeneration gases. The oxygen concentration in air can be reduced to a controlled level to minimize overheating of, or creating hot spots in, the regenerator. The catalyst may also be regenerated reductively with hydrogen, mixtures of hydrogen and carbon monoxide, or other suitable reducing gases.

The catalyst may be regenerated in any number of methods—batch, continuous, semi-continuous, or a combination thereof. Continuous catalyst regeneration is a desired method. Desirably, the catalyst is regenerated to a level of remaining coke from about 0.01 wt % to about 15 wt % of the weight of the catalyst.

The catalyst regeneration temperature should be from about 250° C. to about 750° C., and desirably from about 500° C. to about 700° C. Because the regeneration reaction takes place at a temperature considerably higher than the oxygenate conversion reaction, it may be desirable to cool at least a portion of the regenerated catalyst to a lower temperature before it is sent back to the reactor. A heat exchanger, not shown, located external to the regeneration apparatus may be used to remove some heat from the catalyst after it has been withdrawn from the regeneration apparatus. When the regenerated catalyst is cooled, it is desirable to cool it to a temperature which is from about 200° C. higher to about 200° C. lower than the temperature of the catalyst withdrawn from the reactor. More desirably, the regenerated catalyst is cooled to a temperature from about 10° C. to about 200° C. lower than the temperature of the catalyst withdrawn from the reactor. This cooled catalyst then may be returned to either some portion of the reactor, the regeneration apparatus, or both. When the regenerated catalyst from the regeneration apparatus is returned to the reactor, it may be returned to any portion of the reactor. It may be returned to the catalyst containment area to await contact with the feed, the separation zone to contact products of the feed or a combination of both.

Desirably, catalyst regeneration is carried out at least partially deactivated catalyst that has been stripped of most of readily removable organic materials (organics) in a stripper or stripping chamber first. This stripping can be achieved by passing a stripping gas over the spent catalyst at an elevated temperature. Gases suitable for stripping include steam, nitrogen, helium, argon, methane, $CO_2$, CO, hydrogen, and mixtures thereof. A preferred gas is steam. Gas hourly space velocity (GHSV, based on volume of gas to volume of catalyst and coke) of the stripping gas is from about $0.1\ h^{-1}$ to about $20,000\ h^{-1}$. Acceptable temperatures of stripping are from about 250° C. to about 750° C., and desirably from about 350° C. to about 675° C.

The method of making the preferred olefin product in this invention can include the additional step of making the oxygenate compositions from hydrocarbons such as oil, coal, tar sand, shale, biomass and natural gas. Methods for making the compositions are known in the art. These methods include fermentation to alcohol or ether, making synthesis gas, then converting the synthesis gas to alcohol or ether. Synthesis gas can be produced by known processes such as steam reforming, autothermal reforming and partial oxidization.

One skilled in the art will also appreciate that the olefins produced by the oxygenate-to-olefin conversion reaction of the present invention can be polymerized to form polyolefins, particularly polyethylene and polypropylene. Processes for forming polyolefins from olefins are known in the art. Catalytic processes are preferred. Particularly preferred are metallocene, Ziegler/Natta and acid catalytic systems. See, for example, U.S. Pat. Nos. 3,258,455; 3,305,538; 3,364,190; 5,892,079; 4,659,685; 4,076,698; 3,645,992; 4,302,565; and 4,243,691, the catalyst and process descriptions of each being expressly incorporated herein by reference. In general, these methods involve contacting the olefin product with a polyolefin-forming catalyst at a pressure and temperature effective to form the polyolefin product.

A preferred polyolefin-forming catalyst is a metallocene catalyst. The preferred temperature range of operation is between 50° C. and 240° C. and the reaction can be carried out at low, medium or high pressure, being anywhere from 1 bar to 200 bars. For processes carried out in solution, an inert diluent can be used, and the preferred operating pressure range is between 10 and 150 bars, with a preferred temperature between 120° C. and 230° C. For gas phase processes, it is preferred that the temperature generally be from 60° C. to 160° C., and that the operating pressure be from 5 bars to 50 bars.

In addition to polyolefins, numerous other olefin derivatives may be formed from the olefins produced by the process of the present invention or olefins recovered therefrom. These include, but are not limited to, aldehydes, alcohols, acetic acid, linear alpha olefins, vinyl acetate, ethylene dichloride and vinyl chloride, ethylbenzene, ethylene oxide, ethylene glycol, cumene, isopropyl alcohol, acrolein, allyl chloride, propylene oxide, acrylic acid, ethylene-propylene rubbers, and acrylonitrile, and trimers and dimers of ethylene, propylene or butylenes. The methods of manufacturing these derivatives are well known in the art, and therefore are not discussed here.

Persons of ordinary skill in the art will recognize that many modifications may be made to the present invention without departing from the spirit and scope of the present invention. The embodiments described herein are meant to be illustrative only and should not be taken as limiting the invention, which is defined by the following claims.

What is claimed is:

1. An oxygenate to olefin conversion process comprising:
    (a) feeding an oxygenate feed to a plurality of necks, each neck having a head extending into an associated riser reactor, wherein each riser reactor extends into a shell and into a separation zone of a single hydrocarbon conversion apparatus;
    (b) reacting said feed by contacting with a non-zeolitic molecular sieve catalyst from a catalyst retention zone in a mouth of each riser reactor at a gas superficial velocity of greater than 1 meter per second at any point in the conversion apparatus, wherein each head extending into each riser is positioned at or above the mouth, and the reaction of said feed produces a light olefin product;
    (c) separating said catalyst from said product in the separation zone;
    (d) transporting a portion of said catalyst from said shell of the separation zone to a regenerator apparatus;
    (e) moving a portion of said catalyst from said shell of the separation zone to the catalyst retention zone by way of a catalyst return that defines at least a portion of the catalyst retention zone; and
    (f) returning catalyst from the regenerator apparatus to the separation zone, the catalyst retention zone, the catalyst return or any combination thereof.

2. The process of claim 1 wherein said feed is fed to each of said plurality of riser reactors in a substantially equal amount.

3. The process of claim 2 wherein said feed is fed to each of said plurality of riser reactors such that the flow of feed to each reactor varies by no more than 25%, by volume rate, from one of said plurality of riser reactors to another of said plurality of riser reactors.

4. The process of claim 3 wherein said feed is fed to each of said plurality of riser reactors such that the flow of feed to each reactor varies by no more than 10%, by volume rate, from one of said plurality of riser reactors to another of said plurality of riser reactors.

5. The process of claim 4 wherein said feed is fed to each of said plurality of riser reactors such that the flow of feed to each reactor varies by no more than 1%, by volume rate, from one of said plurality of riser reactors to another of said plurality of riser reactors.

6. The process of claim 2 wherein said feed is fed to each of said plurality of riser reactors such that the flow of feed to each reactor varies by no more than 25%, by mass percent for each component in the feed, from one of said plurality of riser reactors to another of said plurality of riser reactors.

7. The process of claim 6 wherein said feed is fed to each of said plurality of riser reactors such that the flow of feed to each reactor varies by no more than 10%, by mass percent for each component in the feed, from one of said plurality of riser reactors to another of said plurality of riser reactors.

8. The process of claim 7 wherein said feed is fed to each of said plurality of riser reactors such that the flow of feed to each reactor varies by no more than 1%, by mass percent for each component in the feed, from one of said plurality of riser reactors to another of said plurality of riser reactors.

9. The process of claim 1 wherein said catalyst is separated from said product with a separator selected from the group consisting of cyclonic separators, filters, screens, impingement devices, plates, cones and combinations thereof.

10. The process of claim 1 further including the step of stripping said portion of said catalyst transported from the separation zone to the regenerator apparatus prior to entering the regenerator apparatus.

11. The process of claim 1 wherein each of said riser reactors has a height of from 10 meters to 70 meters.

12. The process of claim 11 wherein each of said riser reactors has a width of from one meter to three meters.

13. The process of claim 1 wherein each of said riser reactors has a cross sectional area of no greater than 12 m$^2$.

14. The process of claim 13 wherein each of said riser reactors has a cross sectional area of no greater than 7 m$^2$.

15. The process of claim 14 wherein each of said riser reactors has a cross sectional area or no greater than 3.5 m$^2$.

16. The process of claim 1 wherein each of said riser reactors has a cross sectional area and said cross sectional area of one of said riser reactors varies by no more than 20% from the cross sectional area of another of said riser reactors.

17. The process of claim 16 wherein said cross sectional area of one of said riser reactors varies by no more than 10% from the cross sectional area of another of said riser reactors.

18. The process of claim 17 wherein said cross sectional area of one of said riser reactors varies by no more than 1% from the cross sectional area of another of said riser reactors.

19. The process of claim 1 wherein said catalyst is a silicoaluminophosphate molecular sieve.

20. The process of claim 1 wherein said feed is selected from the group of methanol; ethanol; n-propanol; isopropanol; $C_4$–$C_{10}$ alcohols; methyl ethyl ether; dimethyl ether; diethyl ether; di-isopropyl ether; methyl formate; formaldehyde; di-methyl carbonate; methyl ethyl carbonate; acetone; and mixtures thereof.

* * * * *